(12) United States Patent
Imaoka

(10) Patent No.: US 8,345,357 B2
(45) Date of Patent: Jan. 1, 2013

(54) OPTICAL SYSTEM, IMAGE PROJECTION APPARATUS INCLUDING THE SAME AND AN IMAGE PICKUP DEVICE

(75) Inventor: Masayuki Imaoka, Izumiotsu (JP)

(73) Assignee: Konica Minolta Opto, Inc., Tokyo (JP)

(*) Notice: Subject to any disclaimer, the term of this patent is extended or adjusted under 35 U.S.C. 154(b) by 313 days.

(21) Appl. No.: 12/847,264

(22) Filed: Jul. 30, 2010

(65) Prior Publication Data
US 2011/0032606 A1  Feb. 10, 2011

(30) Foreign Application Priority Data
Aug. 4, 2009  (JP) .................................. 2009-181292

(51) Int. Cl.
*G02B 9/00*  (2006.01)
(52) U.S. Cl. .................... 359/754; 359/642; 359/687
(58) Field of Classification Search .................. 359/642, 359/676–792, 820
See application file for complete search history.

(56) References Cited

U.S. PATENT DOCUMENTS

| | | | | |
|---|---|---|---|---|
| 6,028,715 A * | 2/2000 | Takamoto et al. | ............ | 359/688 |
| 6,650,487 B2 * | 11/2003 | Mori | ............... | 359/772 |
| 6,665,131 B2 * | 12/2003 | Suzuki et al. | ................. | 359/778 |
| 6,710,932 B2 | 3/2004 | Kitaoka et al. | ................ | 359/686 |
| 7,545,578 B2 | 6/2009 | Sugita | ............. | 359/680 |
| 8,064,145 B2 * | 11/2011 | Yasui | ............. | 359/691 |
| 8,149,517 B2 * | 4/2012 | Ohashi | ........... | 359/687 |

FOREIGN PATENT DOCUMENTS
JP         8-297244 A        11/1996

\* cited by examiner

*Primary Examiner* — Thong Nguyen
(74) *Attorney, Agent, or Firm* — Cozen O'Connor

(57) ABSTRACT

Provided is an optical system (PS) which is used in a wavelength range including a near ultraviolet light range having a wavelength longer than approximately 350 nm and a visible light range. The optical system includes at least two first positive lenses which satisfies a predetermined conditional expression concerning anomalous dispersion characteristic and a rate of change of the refractive index with respect to temperature, and is disposed closer to a contraction side than an aperture stop (ST), and at least one second positive lens which satisfies a predetermined conditional expression concerning anomalous dispersion characteristic and a rate of change of the refractive index with respect to temperature.

21 Claims, 17 Drawing Sheets

EXAMPLES 1 TO 3, COMPARISON EXAMPLE 1

FIG.1 EXAMPLES 1 TO 3, COMPARISON EXAMPLE 1

EXAMPLES 4 AND 5, COMPARISON EXAMPLE 2

EXAMPLE 1

EXAMPLE 2

EXAMPLE 3

EXAMPLE 4

EXAMPLE 5

EXAMPLE 6

EXAMPLE 7

EXAMPLE 8

COMPARISON EXAMPLE 1

COMPARISON EXAMPLE 2

SPHERICAL ABERRATION

ASTIGMATISM

DISTORTION

MAGNIFICATION COLOR ABERRATION

COMPARISON EXAMPLE 3

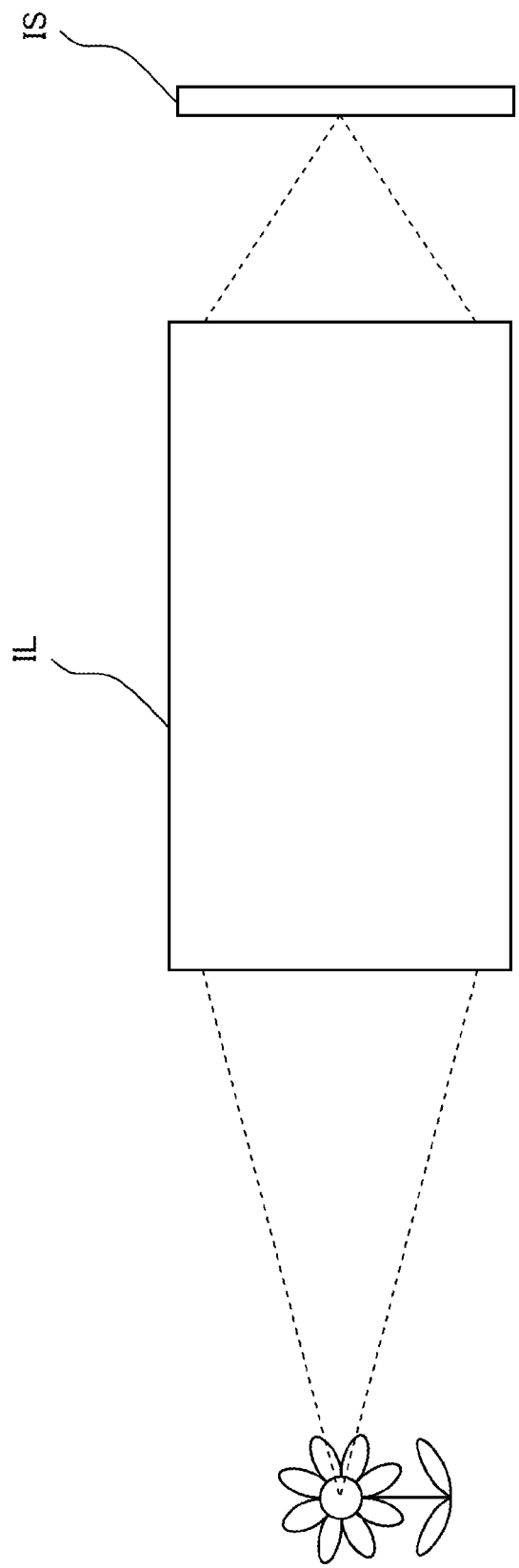

OPTICAL SYSTEM, IMAGE PROJECTION APPARATUS INCLUDING THE SAME AND AN IMAGE PICKUP DEVICE

CROSS-REFERENCE TO RELATED APPLICATIONS

This application is based on Japanese Patent Application No. 2009-181292 filed on Aug. 4, 2009, the contents of which are hereby incorporated by reference.

BACKGROUND OF THE INVENTION

1. Field of the Invention

The present invention relates to an optical system, an image projection apparatus including the same, and an image pickup device. In particular, the present invention relates to an optical system which corrects color aberration and a focus shift due to temperature variation, and an image projection apparatus including the same.

2. Description of Related Art

Recent years, an optical system which is used for an image pickup device of a TV camera, a digital camera and the like is required to have a compact size of an entire optical system and high optical performance. Among optical performances, if color aberration increases, image quality of a color image is extremely deteriorated.

Therefore, in order to correct color aberration appropriately, particularly to correct color aberration appropriately over the entire magnification range from the wide angle end to the telephoto end of the zoom lens, the secondary spectrum in the color aberration is corrected (see JP-A-8-297244).

In other words, the above-mentioned zoom lens includes a focus lens unit which performs focusing, a variator lens group which moves along the optical axis during zooming, and a compensator lens group which moves along the optical axis so as to compensate for image plane variation due to zooming. Three positive lenses of the compensator lens group are made of glass having low dispersion and anomalous dispersion characteristic, and one negative lens of the compensator lens group is made of high dispersion glass having a relatively small refractive index variation with respect to temperature variation.

In this way, by using optical glass having anomalous dispersion characteristic for three positive lenses, color aberration at the F-line and the C-line as well as secondary spectrum from the wide angle end to the telephoto end is reduced, so that variation amount of the axial color aberration is suppressed to be small.

In addition, usually, a zoom lens is constituted so as not to move the focus position during zooming. However, if temperature variation occurs, a refractive index of a lens varies, so that a focal length of the compensator lens group varies. Therefore, the focus position varies during zooming from the wide angle end to the telephoto end. In the zoom lens described above, one negative lens is made of optical glass having a relatively small refractive index variation with respect to temperature so as to reduce move amount of the focus position due to the zooming.

In the zoom lens described above, the color aberration is corrected, but the focus shift remains. In order to eliminate this focus shift, manual focusing operation or a mechanical member for automatic focus is necessary in accordance with zooming.

As a method of correcting such focus shift due to temperature variation, there is known a method of using thermal expansion of a lens barrel which holds the lenses.

For instance, an imaging lens including a plastic lens causes a focus shift due to temperature variation. Usually, a plastic lens has large refractive index variation due to temperature variation and a negative value of the refractive index variation. Therefore, when temperature of the imaging lens rises, a focus position of the imaging lens moves so that an image cannot be formed on a normal image plane of the image pickup element or the like. Therefore, a lens holding barrel which connects the plastic lens with the image pickup element is made of material having a coefficient of linear expansion corresponding to the movement of the focus position (U.S. Pat. No. 6,710,932). With this structure, when temperature rises, the lens holding barrel expands in the optical axis direction so as to cancel the focus position shift due to the refractive index variation of the lens.

However, in the above-mentioned structure, for downsizing the apparatus, the lens holding barrel may not have an enough length in the optical axis direction for obtaining a desired expansion. In addition, for a strength structure of the apparatus, material having an appropriate coefficient of linear expansion may not be selected for the lens holding barrel. Therefore, there is a limitation in the range in which the focus shift can be corrected. In this way, there is a problem in the above-mentioned structure that it is difficult to correct the focus shift appropriately at any time.

In addition, in the optical system that is used for an image projection apparatus such as a projector, three color images are combined, and the combined image is projected onto the projection surface so that the three color images are overlaid on the projection surface. Therefore, it is necessary to correct color shifts of the optical system appropriately with respect to the three color wavelengths. Further, since a high power lamp is used as a light source in the image projection apparatus, the optical system becomes very high temperature. Therefore, it is necessary that the optical system used in the image projection apparatus does not generate a focus shift with respect to temperature variation.

Therefore, there is proposed an image projection lens device including a first lens unit, a second lens unit, and a plurality of lens units disposed closer to the contraction side than the second lens unit, which are arranged in this order from the enlargement side (see U.S. Pat. No. 7,545,578). In this image projection lens device, a positive lens disposed closer to the contraction side than the second lens unit satisfies a predetermined condition concerning a focal length and a rate of change of the refractive index with respect to temperature. Further, a positive lens disposed closer to the contraction side than the first lens unit satisfies a predetermined condition concerning a focal length and an anomalous dispersion. When the condition is satisfied, the color aberration is corrected, and focus position variation due to temperature variation is suppressed.

However, although the above-mentioned structure suppresses focus position variation due to temperature variation, it is difficult to correct color aberration appropriately because only one type of anomalous dispersion glass is used.

SUMMARY OF THE INVENTION

The present invention is created to solve the problem described above, and an object thereof is to provide an optical system that corrects color aberration appropriately and suppresses a focus position shift due to temperature variation so that high image quality can be obtained, and to provide an image projection apparatus including the optical system as well as an image pickup device.

To achieve the above-mentioned object, the present invention provides an optical system which is used in a wavelength range including a near ultraviolet light range having a wavelength longer than approximately 350 nm and a visible light range, in which at least two first positive lenses satisfying the following conditional expressions (1) to (3) are disposed closer to a contraction side than an aperture stop, and at least one second positive lens satisfying the following conditional expressions (1), (4) and (5) is disposed:

$$60 < Vd \tag{1}$$

$$0.67 < 0.0018 Vd + P \tag{2}$$

$$-7.5 \times 10^{-6} < dN/dT < -0.5 \times 10^{-6} \tag{3}$$

$$0.645 < 0.0018 Vd + P \tag{4}$$

$$9 \times 10^{-6} < dN/dT \tag{5}$$

where, Vd denotes an Abbe number at the d-line, P=(Ng−NF)/(NF−NC), Ng denotes a refractive index at the g-line, NF denotes a refractive index at the F-line, NC denotes a refractive index at the C-line, and dN/dT denotes a rate of change of the refractive index with respect to temperature in the vicinity of room temperature.

In addition, to achieve the above-mentioned object, the present invention provides an image projection apparatus including:

an optical modulation element which modulates light in accordance with image data;

an illumination optical system which leads the light to the optical modulation element; and an optical system which leads the light modulated by the optical modulation element to a projection surface.

The optical system includes at least two first positive lenses which satisfy the following conditional expressions (1) to (3) and are disposed closer to a contraction side than an aperture stop, and at least one second positive lens which satisfies the following conditional expressions (1), (4) and (5):

$$60 < Vd \tag{1}$$

$$0.67 < 0.0018 Vd + P \tag{2}$$

$$-7.5 \times 10^{-6} < dN/dT < -0.5 \times 10^{-6} \tag{3}$$

$$0.645 < 0.0018 Vd + P \tag{4}$$

$$9 \times 10^{-6} < dN/dT \tag{5}$$

where, Vd denotes an Abbe number at the d-line, P=(Ng−NF)/(NF−NC), Ng denotes a refractive index at the g-line, NF denotes a refractive index at the F-line, NC denotes a refractive index at the C-line, and dN/dT denotes a rate of change of the refractive index with respect to temperature in the vicinity of room temperature.

In addition, to achieve the above-mentioned object, the present invention provides an image pickup device including:

an optical system through which light enters from an object; and an image pickup element which receives the light from the optical system.

The optical system includes at least two first positive lenses which satisfy the following conditional expressions (1) to (3) and are disposed closer to a contraction side than an aperture stop, and at least one second positive lens which satisfies the following conditional expressions (1), (4) and (5):

$$60 < Vd \tag{1}$$

$$0.67 < 0.0018 Vd + P \tag{2}$$

$$-7.5 \times 10^{-6} < dN/dT < -0.5 \times 10^{-6} \tag{3}$$

$$0.645 < 0.0018 Vd + P \tag{4}$$

$$9 \times 10^{-6} < dN/dT \tag{5}$$

where, Vd denotes an Abbe number at the d-line, P=(Ng−NF)/(NF−NC), Ng denotes a refractive index at the g-line, NF denotes a refractive index at the F-line, NC denotes a refractive index at the C-line, and dN/dT denotes a rate of change of the refractive index with respect to temperature in the vicinity of room temperature.

BRIEF DESCRIPTION OF THE DRAWINGS

FIG. 17 is a schematic diagram of an image pickup device according to the present invention.

DETAILED DESCRIPTION OF THE PREFERRED EMBODIMENTS

Hereinafter, embodiments of the present invention will be described with reference to the attached drawings, but the present invention is not limited to these embodiments. In addition, applications of the invention, terms and the like are not limited to those described below.

Figure 16:
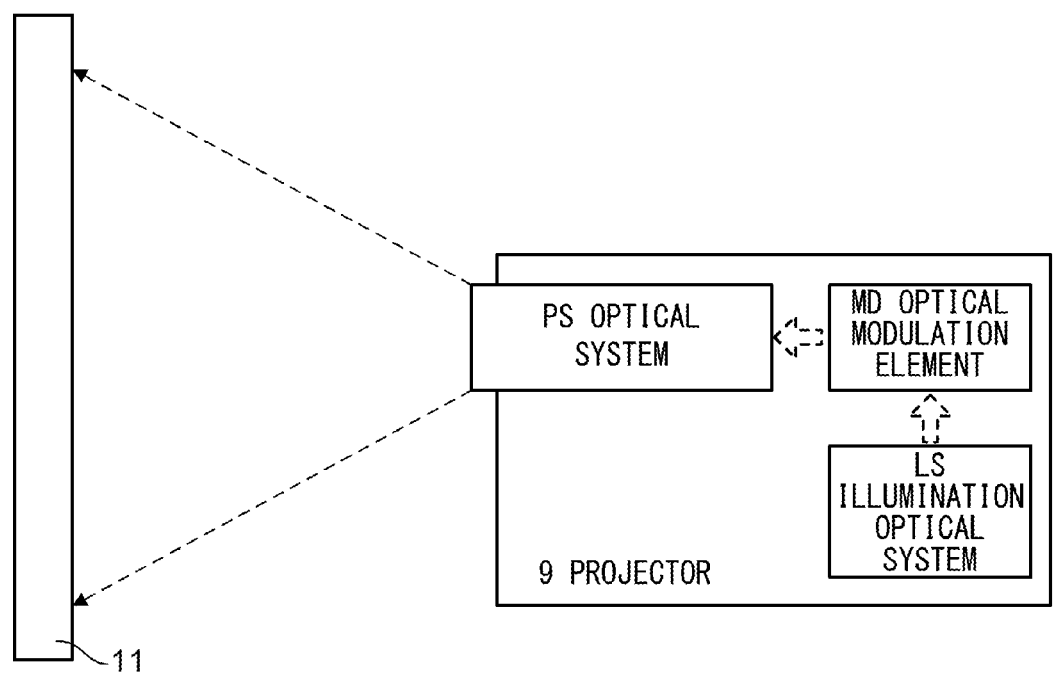
FIG. 16 is a schematic block diagram of an image projection apparatus according to the present invention.

FIG. 16 is a schematic block diagram of a projector 9 as an example of an image projection apparatus according to an embodiment of the present invention. The projector 9 includes an illumination optical system LS, an optical modulation element MD, and a projection optical system PS.

The illumination optical system LS is an optical system which irradiates the optical modulation element MD with light beams from a plurality of light sources having different colors. The optical modulation element MD receives a plurality of light beams from the illumination optical system LS so as to modulate each light beam in accordance with image data or the like. For instance, a digital micromirror device (DMD) and a liquid crystal display element can be named as the optical modulation element MD. The projection optical system PS is an optical system which receives the light modulated by the optical modulation element MD and projects the light to a projection surface 11 such as a screen in a magnified manner.

Figure 1:
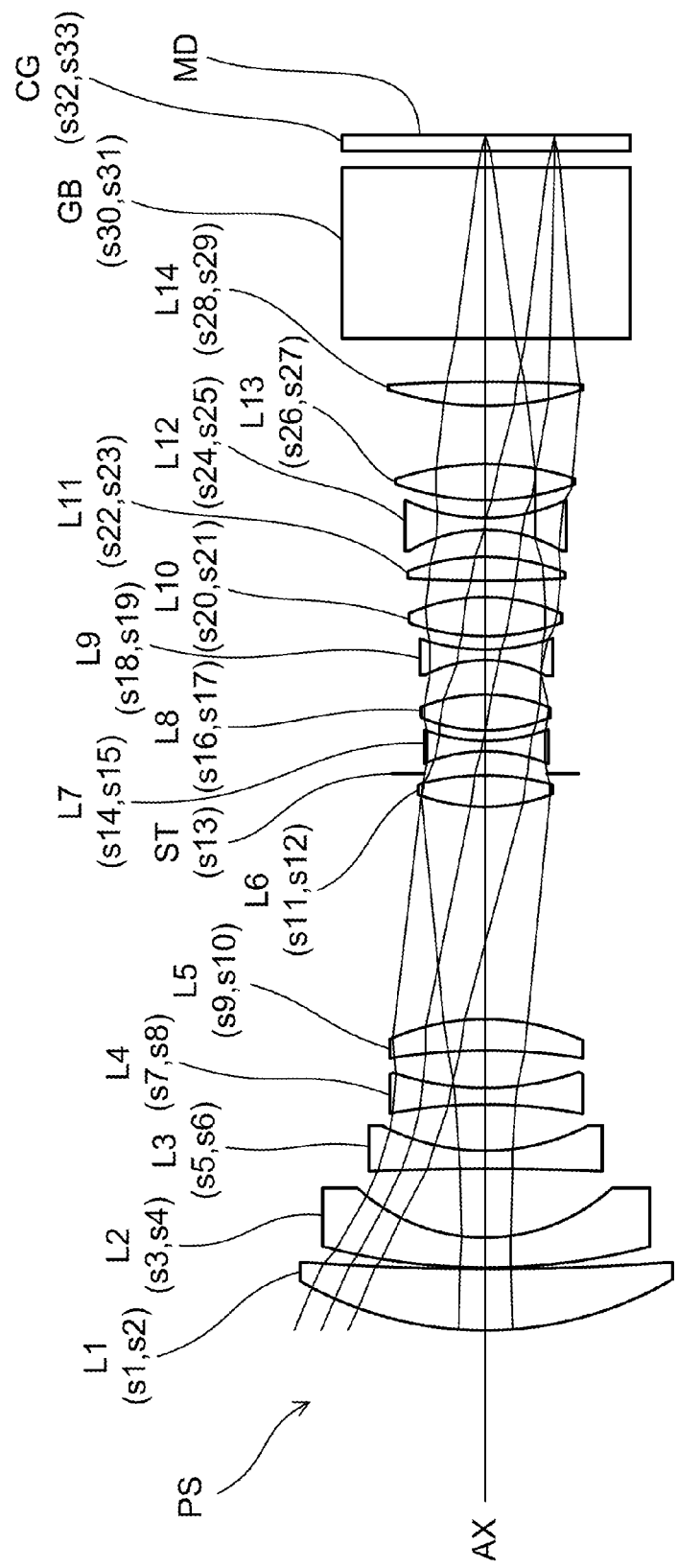
FIG. 1 is a cross sectional view illustrating an optical system according first to third embodiments of the present invention.
Figure 2:
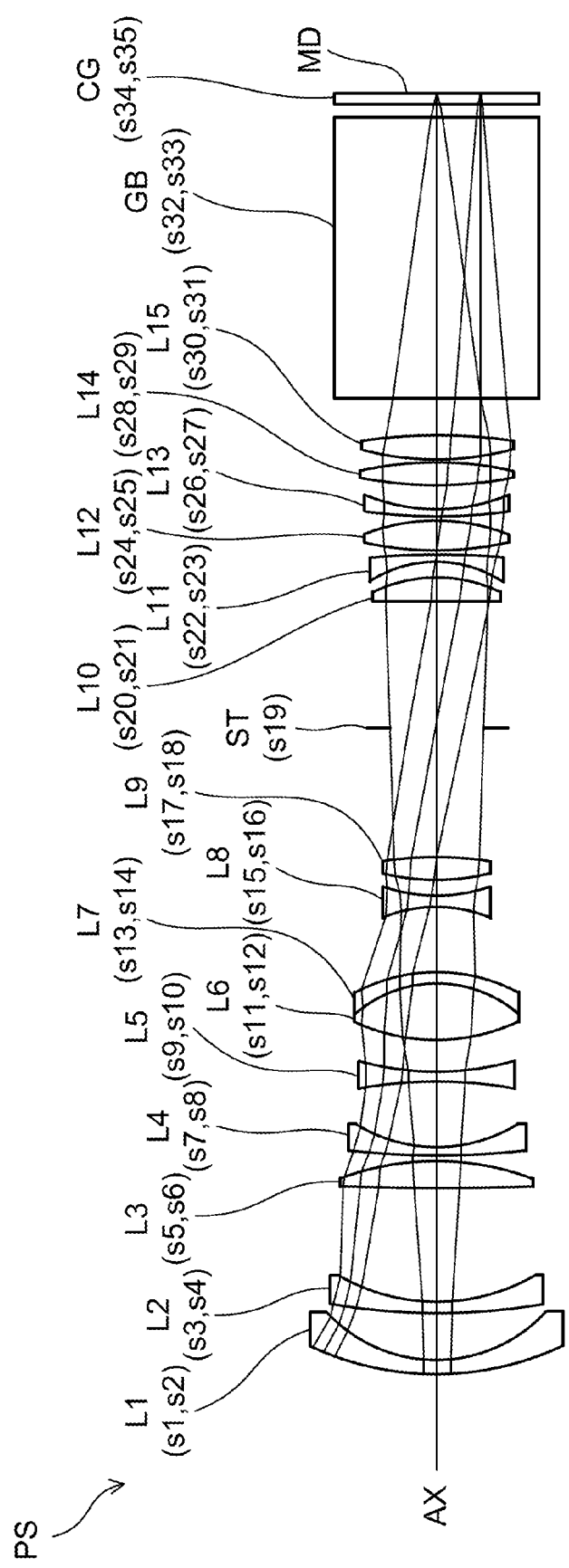
FIG. 2 is a cross sectional view illustrating an optical system according to fourth and fifth embodiment of the present invention.
Figure 3:
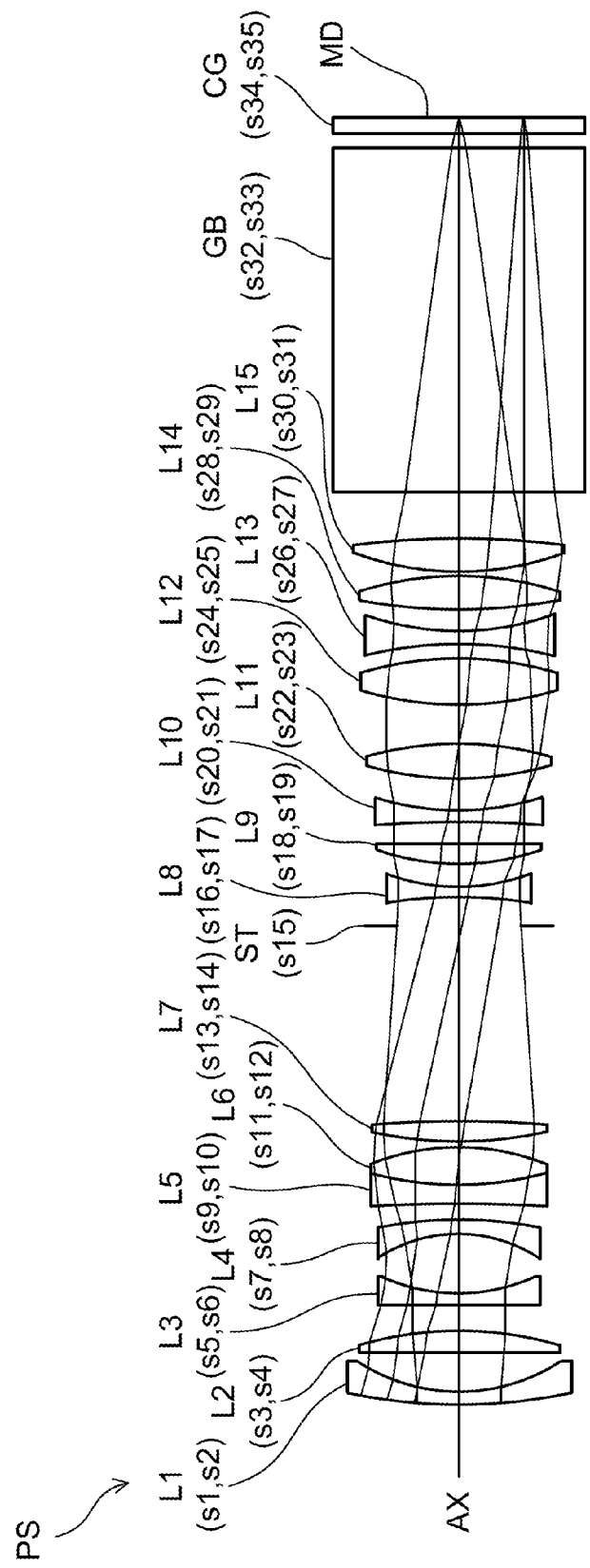
FIG. 3 is a cross sectional view illustrating an optical system according to sixth to eighth embodiment of the present invention.

Next, a configuration of the projection optical system PS (optical system) will be described with reference to FIGS. 1 to 3. FIG. 1 is a cross sectional view illustrating an optical system according to first to third embodiments, FIG. 2 is a cross sectional view illustrating an optical system according to fourth and fifth embodiments, FIG. 3 is a cross sectional view illustrating an optical system according to sixth to eighth embodiments. The optical systems of the first to third embodiments are used in a near ultraviolet light range from a blue color light range to a wavelength of approximately 350 nm, and the optical systems of the fourth to eighth embodiments are used in the visible light range with the center range of the e-line (wavelength is 546.1 nm).

(First Embodiment)

As illustrated in FIG. 1, the optical system PS includes lenses L1 to L14, an aperture stop ST disposed between the lenses L1 to L14, a glass block GB constituted of a prism or the like, and a cover glass CG The optical system PS includes a positive power lens L1 having a meniscus shape with a convex surface facing a enlargement side, a negative power lens L2 having a meniscus shape with a concave surface facing a contraction side, a biconcave lens L3, a biconcave lens L4, a positive power lens L5 having a meniscus shape with a convex surface facing the contraction side, a biconvex lens L6 having a relatively large space with the lens L5 along the axis (optical axis AX), and a biconcave lens L7 arranged in this order from the enlargement side. The aperture stop ST is disposed between the lens L6 and the lens L7. Note that the "power" means a quantity defined as an inverse number of the focal length.

Further, the optical system PS includes a biconvex lens L8, a biconcave lens L9, a biconvex lens L10, a biconvex lens L11, a biconcave lens L12, a biconvex lens L13, and a biconvex lens L14.

The glass block GB and the cover glass CG are disposed on the contraction side of the lens L14. The glass block GB is an optical element such as a prism which combines plurality of light beams of different colors emerged from the optical modulation element MD. The cover glass CG is a glass which protects a light-emerging side of the optical modulation element MD.

As first positive lenses, the lenses L10, L11, L13 and L14 are disposed closer to the contraction side than the aperture stop ST. The lenses L10, L11, L13 and L14 are made of a material having a relatively large Abbe number (low dispersion), a large anomalous dispersion characteristic, and further a negative value of a rate of change of the refractive index with respect to temperature.

As a second positive lens, the lens L6 is disposed. The lens L6 is made of a material having a relatively large Abbe number (low dispersion), a standard or larger anomalous dispersion characteristic, and further a positive value of the rate of change of the refractive index with respect to temperature.

Figure 4:
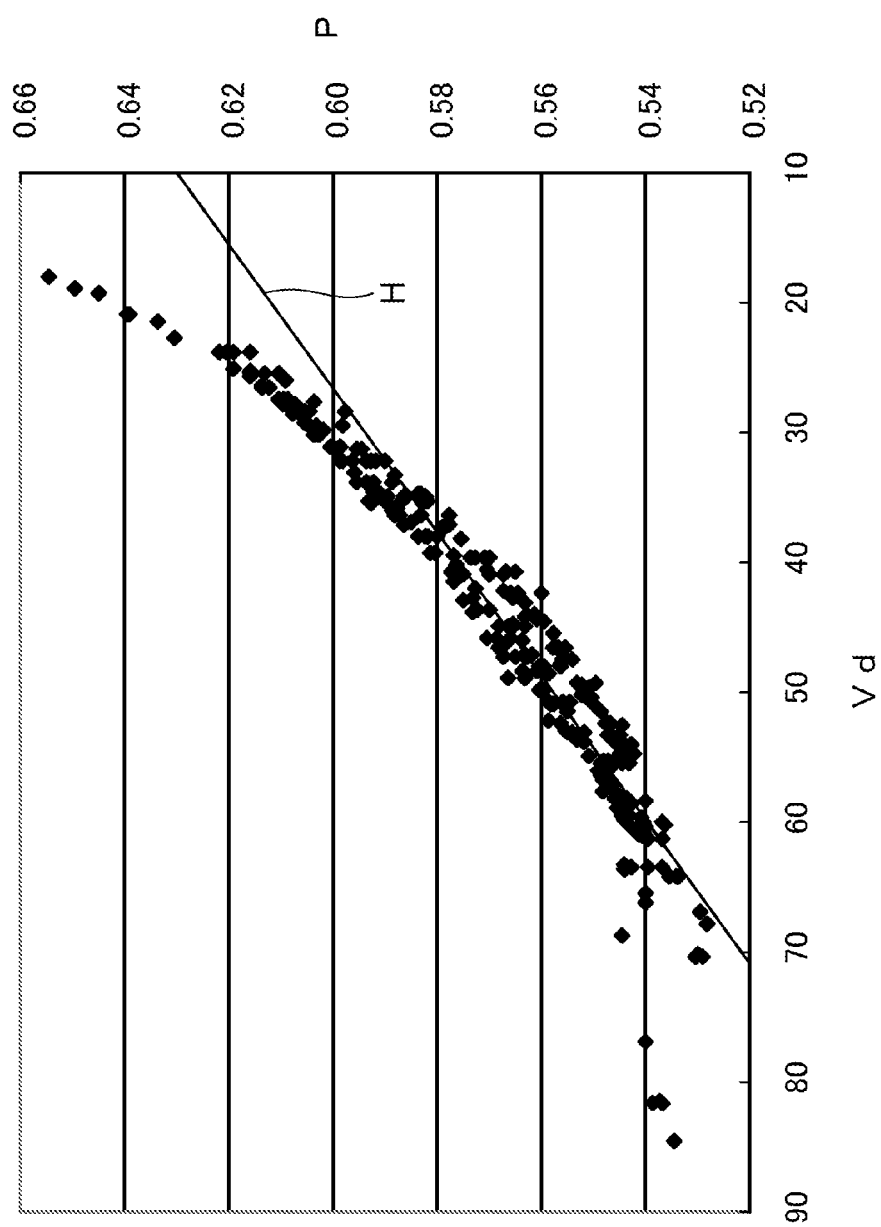
FIG. 4 is a diagram illustrating a relationship between an Abbe number and a partial dispersion ratio of optical glass that is used for the optical system according to the embodiments of the present invention.

Here, the anomalous dispersion characteristic will be described with reference to FIG. 4. FIG. 4 is a graph showing the anomalous dispersion characteristic, in which the horizontal axis represents the Abbe number Vd, and the vertical axis represents a partial dispersion ratio P. The Abbe number Vd is an Abbe number at the d-line (wavelength is 587.56 nm). The partial dispersion ratio is expressed by $P=(Ng-NF)/(NF-NC)$. Note that Ng denotes a refractive index at the g-line (435.8 nm), NF denotes a refractive index at the F-line (486.1 nm), and NC denotes a refractive index at the C-line (656.3 nm).

In the graph of FIG. 4, Abbe numbers Vd and partial dispersion ratios P of optical glasses are plotted, and a standard line H is indicated. This standard line H is a straight line connecting two points of two types of standard optical glasses plotted on the graph. When an optical glass is plotted on the standard line H or in the vicinity thereof, the optical glass has a standard anomalous dispersion characteristic. When the optical glass is apart upward from the standard line H, the optical glass has a large anomalous dispersion characteristic.

Therefore, the first positive lens having a large anomalous dispersion characteristic is formed of an optical glass that is apart upward from the standard line H. On the other hand, the second positive lens having a standard or larger anomalous dispersion characteristic is formed of an optical glass that is close to the standard line H or is apart upward from the standard line H.

(Second Embodiment)

As illustrated in FIG. 1, in the optical system PS of the second embodiment, similarly to the first embodiment, the lenses L1 to L14, the aperture stop ST, the glass block GB and the cover glass CG are disposed.

The optical system PS includes a positive power lens L1 having a meniscus shape with a convex surface facing the enlargement side, a negative power lens L2 having a meniscus shape with a concave surface facing the contraction side, a biconcave lens L3, a biconcave lens L4, a positive power lens L5 having a meniscus shape with a convex surface facing the contraction side, a biconvex lens L6 having a relatively large space along the axis (optical axis AX) with the lens L5, and a biconcave lens L7, which are arranged in this order from the enlargement side. The aperture stop ST is disposed between the lens L6 and the lens L7. Further, the optical system PS includes a biconvex lens L8, a biconcave lens L9, a biconvex lens L10, a biconvex lens L11, a biconcave lens L12, a biconvex lens L13, and a biconvex lens L14.

As first positive lenses, the lenses L10, L11, L13 and L14 are disposed closer to the contraction side than the aperture stop ST. The lenses L10, L11, L13 and L14 are made of a material having a relatively large Abbe number (low dispersion), a large anomalous dispersion characteristic, and further a negative value of a rate of change of the refractive index with respect to temperature.

As a second positive lens, the lens L8 is disposed. The lens L8 is made of a material having a relatively large Abbe number (low dispersion), a standard or larger anomalous dispersion characteristic, and further a positive value of the rate of change of the refractive index with respect to temperature.

(Third Embodiment)

As illustrated in FIG. 1, in an optical system PS of a third embodiment, similarly to the first embodiment, the lenses L1 to L14, the aperture stop ST, the glass block GB and the cover glass CG are disposed.

The optical system PS includes a positive power lens L1 having a meniscus shape with a convex surface facing the enlargement side, a negative power lens L2 having a meniscus shape with a concave surface facing the contraction side, a biconcave lens L3, a biconcave lens L4, a positive power lens L5 having a meniscus shape with a convex surface facing the contraction side, a biconvex lens L6 having a relatively large space along the axis (optical axis AX) with the lens L5, and a biconcave lens L7, which are arranged in this order from the enlargement side. The aperture stop ST is disposed between the lens L6 and the lens L7. Further, the optical system PS includes a biconvex lens L8, a biconcave lens L9, a biconvex lens L10, a biconvex lens L11, a biconcave lens L12, a biconvex lens L13, and a biconvex lens L14.

As first positive lenses, the lenses L10, L11, L13 and L14 are disposed closer to the contraction side than the aperture stop ST. The lenses L10, L11, L13 and L14 are made of a material having a relatively large Abbe number (low dispersion), a large anomalous dispersion characteristic, and further a negative value of a rate of change of the refractive index with respect to temperature.

As second positive lenses, the lenses L6 and L8 are disposed. The lenses L6 and L8 are made of a material having a relatively large Abbe number (low dispersion), a standard or larger anomalous dispersion characteristic, and further a positive value of the rate of change of the refractive index with respect to temperature.

(Fourth Embodiment)

As illustrated in FIG. 2, the optical system PS includes lenses L1 to L15, the aperture stop ST disposed between the lenses L1 and L15, the glass block GB constituted of the prism and the like, and the cover glass CG The optical system PS includes a negative power lens L1 having a meniscus shape with a concave surface facing the contraction side, a negative power lens L2 having a meniscus shape with a concave surface facing the contraction side, a biconvex lens L3, a negative power lens L4 having a meniscus shape with a concave surface facing the contraction side, a biconcave lens L5, a biconvex lens L6, a negative power lens L7 having a meniscus shape that is cemented to the biconvex lens L6, a biconcave lens L8, a biconvex lens L9, and a biconvex lens L10 having a relatively large space along the axis (optical axis AX) with the lens L9, which are arranged in this order from the enlargement side. The aperture stop ST is disposed between the lens L9 and the lens L10.

Further, the optical system PS includes a negative power lens L11 having a meniscus shape with a concave surface facing the enlargement side, a biconvex lens L12, a negative power lens L13 having a meniscus shape with a concave surface facing the contraction side, a biconvex lens L14, and the biconvex lens L15.

The glass block GB and the cover glass CG are disposed on the contraction side of the lens L15. The glass block GB is an optical element such as a prism or the like which combines a plurality of light beams of different colors emitted from the optical modulation element MD. The cover glass CG is glass which protects the light-emerging side of the optical modulation element MD.

As first positive lenses, the lenses L12, L14 and L15 are disposed closer to the contraction side than the aperture stop ST. The lenses L12, L14 and L15 are made of a material having a relatively large Abbe number (low dispersion), a large anomalous dispersion characteristic, and further a negative value of a rate of change of the refractive index with respect to temperature.

As a second positive lens, the lens L10 is disposed. The lens L10 is made of a material having a relatively large Abbe number (low dispersion), a standard or larger anomalous dispersion characteristic, and further a positive value of the rate of change of the refractive index with respect to temperature.

(Fifth Embodiment)

As illustrated in FIG. 2, in the optical system PS of a fifth embodiment, similarly to the fourth embodiment, the lenses L1 to L15, the aperture stop ST, the glass block GB and the cover glass CG are disposed.

The optical system PS includes a negative power lens L1 having a meniscus shape with a concave surface facing the contraction side, a negative power lens L2 having a meniscus shape with a concave surface facing the contraction side, a biconvex lens L3, a negative power lens L4 having a meniscus shape with a concave surface facing the contraction side, a biconcave lens L5, a biconvex lens L6, a negative power lens L7 having a meniscus shape that is cemented to the biconvex lens L6, a biconcave lens L8, a biconvex lens L9, and a biconvex lens L10 having a relatively large space along the axis (optical axis AX) with the lens L9, which are arranged in this order from the enlargement side. The aperture stop ST is disposed between the lens L9 and the lens L10. Further, the optical system PS includes a negative power lens L11 having a meniscus shape with a concave surface facing the enlargement side, a biconvex lens L12, a negative power lens L13 having a meniscus shape with a concave surface facing the contraction side, a biconvex lens L14, and a biconvex lens L15.

As first positive lenses, the lenses L14 and L15 are disposed closer to the contraction side than the aperture stop ST. The lenses L14 and L15 are made of a material having a relatively large Abbe number (low dispersion), a large anomalous dispersion characteristic, and further a negative value of a rate of change of the refractive index with respect to temperature.

As a second positive lens, the lens L12 is disposed. The lens L12 is made of a material having a relatively large Abbe number (low dispersion), a standard or larger anomalous dispersion characteristic, and further a positive value of the rate of change of the refractive index with respect to temperature.

(Sixth Embodiment)

As illustrated in FIG. 3, the optical system PS includes lenses L1 to L15, the aperture stop ST disposed between the lenses L1 and L15, the glass block GB constituted of the prism and the like, and the cover glass CG.

The optical system PS includes a negative power lens L1 having a meniscus shape with a concave surface facing the contraction side, a positive power lens L2 having a meniscus shape with a convex surface facing the contraction side, a planoconcave lens L3 having a concave surface facing the contraction side, a negative power lens L4 having a meniscus shape with a concave surface facing the enlargement side, a biconcave lens L5, a biconvex lens L6 that is cemented to the lens L5, a biconvex lens L7, and a biconcave lens L8 having a relatively large space along the axis (optical axis AX) with the lens L7, which are arranged in this order from the enlargement side. The aperture stop ST is disposed between the lens L7 and the lens L8.

Further, the optical system PS includes a biconvex lens L9, a biconcave lens L10, a biconvex lens L11, a biconvex lens L12, a biconcave lens L13, a biconvex lens L14, and a biconvex lens L15.

The glass block GB and the cover glass CG are disposed on the contraction side of the lens L15. The glass block GB is an optical element such as a prism or the like which combines a plurality of light beams of different colors emitted from the optical modulation element MD. The cover glass CG is glass which protects the light-emerging side of the optical modulation element MD.

As first positive lenses, the lenses L12, L14 and L15 are disposed closer to the contraction side than the aperture stop ST. The lenses L12, L14 and L15 are made of a material having a relatively large Abbe number (low dispersion), a large anomalous dispersion characteristic, and further a negative value of a rate of change of the refractive index with respect to temperature.

As a second positive lens, the lens L11 is disposed. The lens L11 is made of a material having a relatively large Abbe number (low dispersion), a standard or larger anomalous dispersion characteristic, and further a positive value of the rate of change of the refractive index with respect to temperature.

(Seventh Embodiment)

As illustrated in FIG. 3, in an optical system PS of the seventh embodiment, similarly to the sixth embodiment, the lenses L1 to L15, the aperture stop ST, the glass block GB and the cover glass CG are disposed.

The optical system PS includes a negative power lens L1 having a meniscus shape with a concave surface facing the contraction side, a positive power lens L2 having a meniscus shape with a convex surface facing the contraction side, a planoconcave lens L3 having a concave surface facing the contraction side, a negative power lens L4 having a meniscus shape with a concave surface facing the enlargement side, a biconcave lens L5, a biconvex lens L6 that is cemented to the lens L5, a biconvex lens L7, a biconcave lens L8 having a relatively large space along the axis (optical axis AX) with the lens L7, which are arranged in this order from the enlargement side. The aperture stop ST is disposed between the lens L7 and the lens L8. Further, the optical system PS includes a biconvex lens L9, a biconcave lens L10, a biconvex lens L11, a biconvex lens L12, a biconcave lens L13, a biconvex lens L14, and a biconvex lens L15.

As first positive lenses, the lenses L11, L14 and L15 are disposed closer to the contraction side than the aperture stop ST. The lenses L11, L14 and L15 are made of a material having a relatively large Abbe number (low dispersion), a large anomalous dispersion characteristic, and further a negative value of a rate of change of the refractive index with respect to temperature.

As a second positive lens, the lens L12 is disposed. The lens L12 is made of a material having a relatively large Abbe number (low dispersion), a standard or larger anomalous dispersion characteristic, and further a positive value of the rate of change of the refractive index with respect to temperature.

(Eighth Embodiment)

As illustrated in FIG. 3, in the optical system PS of an eighth embodiment, similarly to the sixth embodiment, the lenses L1 to L15, the aperture stop ST, the glass block GB and the cover glass CG are disposed.

The optical system PS includes a negative power lens L1 having a meniscus shape with a concave surface facing the contraction side, a positive power lens L2 having a meniscus shape with a convex surface facing the contraction side, a planoconcave lens L3 having a concave surface facing the contraction side, a negative power lens L4 having a meniscus shape with a concave surface facing the enlargement side, a biconcave lens L5, a biconvex lens L6 that is cemented to the lens L5, a biconvex lens L7, a biconcave lens L8 having a relatively large space along the axis (optical axis AX) with the lens L7, which are arranged in this order from the enlargement side. The aperture stop ST is disposed between the lens L7 and the lens L8. Further, the optical system PS includes a biconvex lens L9, a biconcave lens L10, a biconvex lens L11, a biconvex lens L12, a biconcave lens L13, a biconvex lens L14, and a biconvex lens L15.

As first positive lenses, the lenses L14 and L15 are disposed closer to the contraction side than the aperture stop ST. The lenses L14 and L15 are made of a material having a relatively large Abbe number (low dispersion), a large anomalous dispersion characteristic, and further a negative value of a rate of change of the refractive index with respect to temperature.

As a second positive lens, the lenses L11 and L12 are disposed. The lenses L11 and L12 are made of a material having a relatively large Abbe number (low dispersion), a standard or larger anomalous dispersion characteristic, and further a positive value of the rate of change of the refractive index with respect to temperature.

As described above, the optical systems PS of the first to the eighth embodiments are optical systems that are used in the near ultraviolet light range from the visible light range to a wavelength of approximately 350 nm, and at least two first positive lenses satisfying the following conditional expressions (1) to (3) are disposed closer to the contraction side than the aperture stop ST. Further, at least one second positive lens satisfying the following conditional expressions (1), (4) and (5) is disposed.

$$60 < Vd \tag{1}$$

$$0.67 < 0.0018 Vd + P \tag{2}$$

$$-7.5 \times 10^{-6} < dN/dT < -0.5 \times 10^{-6} \tag{3}$$

$$0.645 < 0.0018 Vd + P \tag{4}$$

$$9 \times 10^{-6} < dN/dT \tag{5}$$

Here, Vd denotes an Abbe number at the d-line, $P=(Ng-NF)/(NF-NC)$ (P denotes a partial dispersion ratio), Ng denotes a refractive index at the g-line, NF denotes a refractive index at the F-line, NC denotes a refractive index at the C-line, and dN/dT denotes a rate of change of the refractive index with respect to temperature in the vicinity of room temperature within the range from 20 to 40 degrees centigrade.

The conditional expression (1) defines an appropriate range of the Abbe number Vd of the first positive lens and the second positive lens. If the lower limit of the conditional expression (1) is exceeded, the axial color aberration and the magnification color aberration cannot be sufficiently corrected in a predetermined wavelength range. When the conditional expression (1) is satisfied, the axial color aberration and the magnification color aberration can be corrected appropriately.

The conditional expression (2) defines an appropriate range of the anomalous dispersion characteristic of the first positive lens. When this conditional expression is satisfied, it means that the first positive lens is made of optical glass that is apart upward from the standard line H illustrated in FIG. 4. If the lower limit of the conditional expression (2) is exceeded, the anomalous dispersion characteristic is apt to be insufficient, so that the secondary spectrum increases. When the conditional expression (2) is satisfied, the anomalous dispersion characteristic of the first positive lens increases so that the secondary spectrum of the axial color aberration can be appropriately corrected. In this embodiment, the first positive lens is made of optical glass having dispersion Vd=81.54 and a partial dispersion ratio P=0.537, or dispersion Vd=81.61 and a partial dispersion ratio P=0.539 in the graph illustrated in FIG. 4.

Further, since the first positive lens is disposed closer to the contraction side than the aperture stop ST, the first positive lens is disposed at the position where an on-axis light beam has a large width. Since this on-axis light beam is converged by the first positive lens, the axial color aberration can be corrected more appropriately.

Usually, optical glass having low dispersion (large Abbe number) and large anomalous dispersion characteristic has a tendency that the rate of change of the refractive index dN/dT with respect to temperature increases on a negative side. If many lenses made of the above-mentioned material are disposed in the optical system, a focus position shift of the optical system due to a temperature variation increases. However, when the rate of change of the refractive index dN/dT of the first positive lens is set to an appropriate range as illustrated in the conditional expression (3), an increase of the focus position shift accompanying a refractive index variation of the first positive lens can be suppressed even if the temperature changes.

In this way, since a plurality of first positive lenses satisfying the conditional expressions (1) to (3) are disposed, the secondary spectrum of the axial color aberration can be appropriately corrected, and an increase of a focus position shift of the optical system due to a temperature variation can be suppressed. It is preferable to provide the optical system with two to four first positive lenses.

Further, the optical system described above in each of the first to the eighth embodiments is a projection optical system that is used for the projector 9, essentially, a screen surface (projection surface) is the image plane while an element surface of the optical modulation element MD is an object surface. However, for convenience sake, the screen surface is regarded as the object surface while the optical modulation element surface is regarded as the image plane so as to evaluate optical performance on the optical modulation element surface (image plane).

Next, the conditional expression (4) defines an appropriate range of the anomalous dispersion characteristic of the second positive lens. When this conditional expression is satisfied, it means that the second positive lens is made of optical glass that is near the standard line H or apart upward from the standard line H illustrated in FIG. 4. If the lower limit of the conditional expression (4) is exceeded, the anomalous dispersion characteristic is apt to be insufficient, so that the secondary spectrum increases. When the conditional expression (4) is satisfied, the secondary spectrum of the axial color aberration can be appropriately corrected.

The conditional expression (5) defines an appropriate range of the rate of change of the refractive index dN/dT with respect to temperature of the second positive lens. If the lower limit of this conditional expression (5) is exceeded, it becomes difficult to suppress the focus position shift of the optical system. The first positive lens has the rate of change of the refractive index dN/dT on the negative side as shown in the conditional expression (3). When the temperature rises, the refractive index of the first positive lens is decreased. Therefore, if many of the first positive lenses are disposed, the focus position of the optical system moves from a regular position to the contraction side. However, when the second positive lens satisfies the conditional expression (5), it moves the focus position of the optical system to the enlargement side. Therefore, the movement of the focus position due to the first positive lens is canceled so that the focus position shift of the optical system can be suppressed.

In addition, in this embodiment, the second positive lens satisfies the following conditional expression.

$$0.85 < |Fxp/Fxmax| \quad (6)$$

Here, Fxp denotes a distance between the optical axis and a light beam that passes through a position farthest from the optical axis on a lens surface of either the enlargement side or the contraction side in the on-axis light beam that passes through the second positive lens, and Fxmax denotes a maximum value of the distance (Fx) between the optical axis and a light beam that passes through a position farthest from the optical axis on a lens surface of either the enlargement side or the contraction side in the on-axis light beam that passes through each lens constituting the optical system.

The conditional expression (6) defines an appropriate range of the distance between the optical axis and the outermost rim light beam in the on-axis light beam passing through the second positive lens, and is a conditional expression that is preferable for suppressing more of the focus position shift due to the temperature variation. When the second positive lens satisfies the conditional expression (6), it can efficiently correct the movement of the focus position due to the first positive lens. In other words, the first positive lens has the rate of change of the refractive index dN/dT on the negative side. When the temperature rises, the refractive index of the first positive lens is decreased. Thus, the focus position of the optical system moves from the regular position to the contraction side. On the other hand, the second positive lens has the rate of change of the refractive index dN/dT on the positive side. When the temperature rises, the second positive lens moves the focus position of the optical system to the enlargement side. Here, when the second positive lens satisfies the conditional expression (6), a width of the on-axis light beam that passes through the second positive lens becomes relatively large. Since this light beam having a large width is converged by the second positive lens, the movement of the focus position to the contraction side due to the first positive lens is efficiently canceled by the second lens. Therefore, the focus position shift of the optical system can be suppressed to be small.

It is more preferable to satisfy the relationship expressed by the conditional expression (6A) instead of the conditional expression (6).

$$0.9 < |Fxp/Fxmax| \quad (6A)$$

Further, it is still more preferable to satisfy the relationship expressed by the conditional expression (6B) instead of the conditional expression (6).

$$0.95 < |Fxp/Fxmax| \quad (6B)$$

In addition, it is preferable that the second positive lens is made of material having a transmittance of 80% or higher for light having a wavelength of 350 nm with respect to the material having a thickness of 10 mm. When the transmittance is 80% or higher, the transmittance having no problem for practical use can be obtained, and a good color balance can be maintained.

In this embodiment, the second positive lens is made of quartz glass. The quartz glass has a dispersion Vd=67.72, and a partial dispersion ratio P=0.524 in the graph illustrated in FIG. 4, which is a standard anomalous dispersion characteristic such that there is no risk of increasing the color aberration. In addition, the quartz glass has the transmittance of 99.9% for a wavelength of 350 nm, which is sufficiently high for maintaining the color balance appropriately. Further, the quartz glass has a rate of change of the refractive index dN/dT with respect to temperature that is as large as $10\times10^{-6}$. Therefore, the focus position shift generated in the first positive lens can be appropriately corrected so that a decrease of the image quality can be prevented. It is preferable to provide the optical system with one or two second positive lenses.

In addition, in this embodiment, the entire optical system satisfies the following conditional expression.

$$-3<-\Sigma(Pw\times(dN/dT)\times Fx)<3.5 \quad (7)$$

Here, Pw denotes a power of each lens constituting the optical system, Fx denotes a distance between the optical axis and a light beam that passes through a position farthest from the optical axis on a lens surface of either the enlargement side or the contraction side in the on-axis light beam that passes through each lens constituting the optical system, and dN/dT denotes a rate of change of the refractive index of each lens constituting the optical system with respect to temperature in the vicinity of room temperature within the range from 20 to 40 degrees centigrade.

The conditional expression (7) defines an appropriate range of a sum of products of the power, the rate of change of the refractive index with respect to temperature, and the distance between the optical axis and the outermost rim light beam in the on-axis light beam (maximum light beam width) of individual lenses constituting the optical system, and is a preferable conditional expression for suppressing more of the focus position shift when the temperature varies. The focus position shift amount in the optical system when the temperature varies is substantially proportional to the sum of products of the power, the rate of change of the refractive index, and the maximum light beam width of individual lenses. If the lower limit of the conditional expression (7) is exceeded, the focus position shift due to temperature variation becomes too large on the enlargement side. On the contrary, if the upper limit of the conditional expression (7) is exceeded, the focus position shift due to temperature variation becomes too large on the contraction side. When the conditional expression (7) is satisfied, good imaging performance can be maintained even if temperature varies. Since a lens barrel holding the lenses is expanded in the optical axis direction due to a temperature rise, it is preferable to set the upper limit value of the conditional expression (7) larger than an absolute value of the lower limit value as illustrated in the conditional expression (7).

It is more preferable to satisfy the relationship expressed by the conditional expression (7A) instead of the conditional expression (7).

$$-2.5<-\Sigma(Pw\times(dN/dT)\times Fx)<3 \quad (7A)$$

In addition, this embodiment satisfies the following conditional expression.

$$0.1<BF/LL<0.5 \quad (8)$$

Here, BF denotes a back focus amount of the optical system on the contraction side (air conversion value), and LL denotes a total length of the optical system from the first lens surface to the last lens surface of the optical system.

If the back focus of the optical system is long, the axial color aberration is apt to occur. If the optical system is a telecentric system, the magnification color aberration is also apt to occur. Therefore, if the anomalous dispersion glass is used for correcting the color aberration, the back focus amount changes because of a large refractive index variation due to temperature variation, resulting in a change of the focus position. In the case of the optical system including the anomalous dispersion lens that exceeds the lower limit value of the conditional expression (8) and satisfies the conditional expressions (1) to (3), when at least one positive lens satisfying the conditional expressions (1), (4) and (5) is disposed, the focus position shift due to temperature variation can be effectively corrected while the color aberration is corrected.

In addition, if the upper limit value of the conditional expression (8) is exceeded, a strong negative power is necessary on the enlargement side of the optical system. Therefore, it becomes difficult to correct aberration of the optical system. Therefore, it is desirable that the upper limit value of the conditional expression (8) is not exceeded from a viewpoint of the aberration correction.

Further, in the embodiment described above, the case where the optical system is applied to the projection optical system of the image projection apparatus is exemplified, but the present invention is not limited to this case. The present invention may be applied to an imaging optical system that is used for the image pickup device including an image pickup element such as a CCD image sensor or the like. As illustrated in FIG. 17, the image pickup device includes an imaging optical system IL to which light from an object enters and an image pickup element IS which receives light from the imaging optical system IL. Then, the light from an object entering the imaging optical system IL from the enlargement side forms an image on the image pickup element IS disposed on the contraction side.

In addition, in the embodiment described above, the case where the present invention is applied to a unifocal optical system is exemplified, but the present invention is not limited to this case. The present invention may be applied to a zoom lens of a projection optical system, an imaging optical system, or other optical system.

In the case of a zoom lens, the conditional expressions (6) to (8) should be satisfied at the long end at which the focal length of the optical system is long. This is because the focus position shift with respect to temperature variation becomes large at the long end.

In addition, in the embodiment described above, the first positive lens is made of optical glass having a dispersion Vd=81.54 and a partial dispersion ratio P=0.537, or a dispersion Vd=81.61 and a partial dispersion ratio P=0.539, but the present invention is not limited to the dispersion values and the partial dispersion ratios. It is sufficient if the first positive lens has an Abbe number defined by the conditional expression (1) and anomalous dispersion characteristic defined by the conditional expression (3).

In addition, in the embodiment described above, the second positive lens is made of optical glass having a dispersion Vd=67.72 and a partial dispersion ratio P=0.524, but the present invention is not limited to the dispersion value and the partial dispersion ratio. It is sufficient if the second positive lens has an Abbe number defined by the conditional expression (1) and anomalous dispersion characteristic defined by the conditional expression (4).

The configuration of the optical system of the present invention will be described more specifically with reference to lens configuration data and an aberration diagram of the examples. Note that the present invention is not limited to these examples. Examples 1 to 3 correspond respectively to the first to the third embodiments, and FIG. 1. Examples 4 and 5 correspond respectively to the fourth and the fifth embodiments, and FIG. 2. Examples 6 to 8 correspond respectively to the sixth to the eighth embodiments, and FIG. 3.

The lens configuration of each example and specification thereof are shown by surface data, various data and single lens data.

The surface data shows a surface number s, a curvature radius r (mm), an on-axis intersurface space d (mm), a refractive index Nd at d-line (wavelength 587.56 nm), and an Abbe number Vd at the d-line, in this order from the left column in the example data below. In addition, P in the surface data denotes a partial dispersion ratio, dN/dT denotes a rate of change of the refractive index of each lens with respect to temperature in the vicinity of room temperature, and further Fx denotes a distance between the optical axis and a light beam that passes through a position farthest from the optical axis on a lens surface of either the enlargement side or the contraction side in the on-axis light beam that passes through each lens.

Symbols used in the various data are as follows. The symbol f denotes a focal length of the entire optical system (mm), Fno denotes an F-number, Y'max denotes a maximum image height (mm), L denotes a projection distance (mm), and B denotes magnification.

EXAMPLE 1

The unit is mm.

[Surface data]

| s | r | d | Nd | Vd | P | dN/dT(×10$^{-6}$) | Fx |
|---|---|---|---|---|---|---|---|
| 1 | 65.569 | 10.787 | 1.651597 | 58.55 | 0.543 | 2.2 | 4.82 |
| 2 | 437.481 | 0.200 | | | | | |
| 3 | 113.597 | 5.106 | 1.496999 | 81.54 | 0.537 | −6.2 | 4.59 |
| 4 | 33.293 | 12.671 | | | | | |
| 5 | −493.774 | 3.031 | 1.496999 | 81.54 | 0.537 | −6.2 | 4.73 |
| 6 | 39.979 | 8.299 | | | | | |
| 7 | −88.932 | 2.482 | 1.496999 | 81.54 | 0.537 | −6.2 | 5.64 |
| 8 | 50.310 | 6.865 | | | | | |
| 9 | −112.049 | 5.725 | 1.651597 | 58.55 | 0.543 | 2.2 | 7.47 |
| 10 | −41.759 | 37.375 | | | | | |
| 11 | 33.518 | 5.680 | 1.458470 | 67.72 | 0.524 | 9.9 | 11.33 |
| 12 | −43.889 | 0.200 | | | | | |
| 13(stop) | INF | 4.119 | | | | | |
| 14 | −28.973 | 1.564 | 1.518229 | 58.90 | 0.546 | 0.7 | 10.46 |
| 15 | 31.052 | 1.869 | | | | | |
| 16 | 29.735 | 6.682 | 1.487490 | 70.23 | 0.530 | −0.7 | 10.92 |
| 17 | −29.327 | 6.010 | | | | | |
| 18 | −22.559 | 1.531 | 1.518229 | 58.90 | 0.546 | 0.7 | 9.86 |
| 19 | 36.118 | 2.339 | | | | | |
| 20 | 40.467 | 7.223 | 1.496999 | 81.54 | 0.537 | −6.2 | 10.59 |
| 21 | −33.300 | 2.572 | | | | | |
| 22 | 238.748 | 4.621 | 1.496999 | 81.54 | 0.537 | −6.2 | 10.15 |
| 23 | −37.761 | 4.547 | | | | | |
| 24 | −26.599 | 1.921 | 1.518229 | 58.90 | 0.546 | 0.7 | 8.70 |
| 25 | 33.750 | 3.365 | | | | | |
| 26 | 46.703 | 6.578 | 1.496999 | 81.54 | 0.537 | −6.2 | 8.73 |
| 27 | −49.623 | 9.853 | | | | | |
| 28 | 53.076 | 4.702 | 1.496999 | 81.54 | 0.537 | −6.2 | 7.36 |
| 29 | −258.329 | 7.660 | | | | | |
| 30 | INF | 30.000 | 1.516800 | 64.20 | | | |
| 31 | INF | 3.000 | | | | | |
| 32 | INF | 3.000 | 1.508470 | 61.19 | | | |
| 33 | INF | 1.500 | | | | | |

[Various data]

| | |
|---|---|
| f | 28.8 |
| Fno | 2.5 |
| Y'max | 12.3 |
| L | 314 |
| B | −13.1 |

[Single lens data]

| lens | start surface | focal length |
|---|---|---|
| 1 | 1 | 117.030 |
| 2 | 3 | −96.803 |
| 3 | 5 | −74.276 |
| 4 | 7 | −64.272 |
| 5 | 9 | 98.980 |
| 6 | 11 | 42.430 |
| 7 | 14 | −28.667 |
| 8 | 16 | 31.454 |
| 9 | 18 | −26.558 |
| 10 | 20 | 37.991 |
| 11 | 22 | 65.969 |
| 12 | 24 | −28.396 |

-continued

| The unit is mm. | | |
|---|---|---|
| 13 | 26 | 49.532 |
| 14 | 28 | 89.038 |

EXAMPLE 2

| The unit is mm. | | | | | | | |
|---|---|---|---|---|---|---|---|
| [Surface data] | | | | | | | |
| s | r | d | Nd | Vd | P | dN/dT(×10$^{-6}$) | Fx |
| 1 | 64.353 | 11.040 | 1.6515969 | 58.55 | 0.543 | 2.2 | 4.80 |
| 2 | 450.477 | 0.200 | | | | | |
| 3 | 109.851 | 4.250 | 1.4969993 | 81.54 | 0.537 | −6.2 | 4.57 |
| 4 | 33.228 | 12.670 | | | | | |
| 5 | −749.972 | 3.049 | 1.4969993 | 81.54 | 0.537 | −6.2 | 4.70 |
| 6 | 38.802 | 8.587 | | | | | |
| 7 | −81.572 | 2.475 | 1.4969993 | 81.54 | 0.537 | −6.2 | 5.63 |
| 8 | 49.162 | 6.766 | | | | | |
| 9 | −116.543 | 5.728 | 1.6515969 | 58.55 | 0.543 | 2.2 | 7.45 |
| 10 | −42.073 | 37.978 | | | | | |
| 11 | 36.250 | 5.768 | 1.4874899 | 70.23 | 0.530 | −0.7 | 11.43 |
| 12 | −45.840 | 0.200 | | | | | |
| 13(stop) | INF | 4.025 | | | | | |
| 14 | −30.796 | 1.581 | 1.5182289 | 58.9 | 0.546 | 0.7 | 10.53 |
| 15 | 31.905 | 1.738 | | | | | |
| 16 | 29.252 | 6.684 | 1.45847 | 67.72 | 0.524 | 9.9 | 10.95 |
| 17 | −29.999 | 6.035 | | | | | |
| 18 | −22.799 | 1.542 | 1.5182289 | 58.9 | 0.546 | 0.7 | 9.98 |
| 19 | 37.427 | 2.296 | | | | | |
| 20 | 41.440 | 7.235 | 1.4969993 | 81.54 | 0.537 | −6.2 | 10.73 |
| 21 | −33.197 | 2.716 | | | | | |
| 22 | 195.326 | 4.728 | 1.4969993 | 81.54 | 0.537 | −6.2 | 10.29 |
| 23 | −38.297 | 4.542 | | | | | |
| 24 | −26.966 | 1.932 | 1.5182289 | 58.9 | 0.546 | 0.7 | 8.83 |
| 25 | 33.082 | 3.348 | | | | | |
| 26 | 44.832 | 6.784 | 1.4969993 | 81.54 | 0.537 | −6.2 | 8.86 |
| 27 | −49.125 | 10.478 | | | | | |
| 28 | 51.857 | 4.536 | 1.4969993 | 81.54 | 0.537 | −6.2 | 7.35 |
| 29 | −449.048 | 7.660 | | | | | |
| 30 | INF | 30.000 | 1.5168 | 64.2 | | | |
| 31 | INF | 3.000 | | | | | |
| 32 | INF | 3.000 | 1.50847 | 61.19 | | | |
| 33 | INF | 1.500 | | | | | |

| [Various data] | |
|---|---|
| f | 28.8 |
| Fno | 2.5 |
| Y'max | 12.3 |
| L | 314 |
| B | −13.1 |

| [Single lens data] | | |
|---|---|---|
| lens | start surface | focal length |
| 1 | 1 | 113.937 |
| 2 | 3 | −97.648 |
| 3 | 5 | −74.137 |
| 4 | 7 | −61.335 |
| 5 | 9 | 98.071 |
| 6 | 11 | 42.502 |
| 7 | 14 | −29.980 |
| 8 | 16 | 33.492 |
| 9 | 18 | −27.103 |
| 10 | 20 | 38.319 |
| 11 | 22 | 64.860 |
| 12 | 24 | −28.356 |
| 13 | 26 | 48.322 |
| 14 | 28 | 93.820 |

EXAMPLE 3

The unit is mm.

[Surface data]

| s | r | d | Nd | Vd | P | dN/dT(×10⁻⁶) | Fx |
|---|---|---|---|---|---|---|---|
| 1 | 65.150 | 10.902 | 1.6515969 | 58.55 | 0.543 | 2.2 | 4.81 |
| 2 | 451.927 | 0.200 | | | | | |
| 3 | 100.947 | 4.553 | 1.4969993 | 81.54 | 0.537 | −6.2 | 4.58 |
| 4 | 34.292 | 11.954 | | | | | |
| 5 | −2030.126 | 3.044 | 1.4969993 | 81.54 | 0.537 | −6.2 | 4.63 |
| 6 | 33.845 | 9.203 | | | | | |
| 7 | −81.997 | 2.449 | 1.4969993 | 81.54 | 0.537 | −6.2 | 5.63 |
| 8 | 49.841 | 6.578 | | | | | |
| 9 | −121.807 | 5.742 | 1.6515969 | 58.55 | 0.543 | 2.2 | 7.44 |
| 10 | −42.042 | 36.852 | | | | | |
| 11 | 36.014 | 5.428 | 1.45847 | 67.72 | 0.524 | 9.9 | 11.32 |
| 12 | −43.472 | 0.200 | | | | | |
| 13(stop) | INF | 3.968 | | | | | |
| 14 | −31.205 | 1.574 | 1.5182289 | 58.9 | 0.546 | 0.7 | 10.52 |
| 15 | 31.884 | 1.717 | | | | | |
| 16 | 29.048 | 6.601 | 1.45847 | 67.72 | 0.524 | 9.9 | 10.95 |
| 17 | −31.093 | 6.181 | | | | | |
| 18 | −22.620 | 1.550 | 1.5182289 | 58.9 | 0.546 | 0.7 | 10.14 |
| 19 | 39.739 | 2.297 | | | | | |
| 20 | 44.319 | 7.292 | 1.4969993 | 81.54 | 0.537 | −6.2 | 10.96 |
| 21 | −31.951 | 2.983 | | | | | |
| 22 | 149.240 | 5.021 | 1.4969993 | 81.54 | 0.537 | −6.2 | 10.50 |
| 23 | −38.008 | 4.586 | | | | | |
| 24 | −26.818 | 1.947 | 1.5182289 | 58.9 | 0.546 | 0.7 | 8.98 |
| 25 | 33.329 | 3.221 | | | | | |
| 26 | 43.691 | 6.795 | 1.4969993 | 81.54 | 0.537 | −6.2 | 9.00 |
| 27 | −50.901 | 11.275 | | | | | |
| 28 | 51.070 | 4.442 | 1.4969993 | 81.54 | 0.537 | −6.2 | 7.34 |
| 29 | −802.672 | 7.660 | | | | | |
| 30 | INF | 30.000 | 1.5168 | 64.2 | | | |
| 31 | INF | 3.000 | | | | | |
| 32 | INF | 3.000 | 1.50847 | 61.19 | | | |
| 33 | INF | 1.500 | | | | | |

[Various data]

| | |
|---|---|
| f | 28.8 |
| Fno | 2.5 |
| Y'max | 12.3 |
| L | 314 |
| B | −13.1 |

[Single lens data]

| lens | start surface | focal length |
|---|---|---|
| 1 | 1 | 115.543 |
| 2 | 3 | −106.919 |
| 3 | 5 | −66.950 |
| 4 | 7 | −61.989 |
| 5 | 9 | 95.807 |
| 6 | 11 | 43.904 |
| 7 | 14 | −30.174 |
| 8 | 16 | 33.927 |
| 9 | 18 | −27.582 |
| 10 | 20 | 38.581 |
| 11 | 22 | 61.500 |
| 12 | 24 | −28.362 |
| 13 | 26 | 48.461 |
| 14 | 28 | 96.777 |

EXAMPLE 4

The unit is mm.

[Surface data]

| s | r | d | Nd | Vd | P | dN/dT (×10⁻⁶) | Fx |
|---|---|---|---|---|---|---|---|
| 1 | 73.292 | 3.200 | 1.6968 | 55.46 | 0.543 | 3.8 | 3.36 |
| 2 | 36.999 | 11.980 | | | | | |
| 3 | 154.035 | 2.600 | 1.6968 | 55.46 | 0.543 | 3.8 | 3.71 |
| 4 | 48.822 | 28.462 | | | | | |
| 5 | 694.482 | 7.023 | 1.7859 | 43.93 | 0.561 | 7.6 | 5.90 |
| 6 | −68.468 | 0.746 | | | | | |
| 7 | 199.069 | 2.200 | 1.58913 | 61.25 | 0.540 | 3.5 | 5.89 |
| 8 | 38.594 | 16.820 | | | | | |
| 9 | −108.823 | 2.000 | 1.58913 | 61.25 | 0.540 | 3.5 | 7.12 |
| 10 | 71.716 | 7.968 | | | | | |
| 11 | 48.390 | 14.000 | 1.5168 | 64.2 | 0.534 | 2.5 | 9.10 |
| 12 | −31.239 | 0.010 | | | | | |
| 13 | −31.239 | 3.000 | 1.7552 | 27.53 | 0.609 | 1.4 | 9.37 |
| 14 | −43.267 | 16.081 | | | | | |
| 15 | −34.950 | 2.496 | 1.497 | 81.61 | 0.539 | −5.9 | 9.31 |
| 16 | 40.744 | 3.805 | | | | | |
| 17 | 55.002 | 5.993 | 1.62004 | 36.3 | 0.587 | 1.9 | 10.47 |
| 18 | −91.034 | 32.163 | | | | | |
| 19 (stop) | INF | 31.325 | | | | | |
| 20 | −6287.043 | 5.950 | 1.45847 | 67.72 | 0.524 | 9.9 | 12.81 |
| 21 | −36.537 | 3.816 | | | | | |
| 22 | −30.792 | 2.011 | 1.8061 | 40.72 | 0.567 | 5.6 | 12.80 |
| 23 | −199.818 | 0.526 | | | | | |
| 24 | 82.433 | 7.961 | 1.497 | 81.61 | 0.539 | −5.9 | 13.39 |
| 25 | −49.467 | 0.500 | | | | | |
| 26 | 134.001 | 2.000 | 1.7859 | 43.93 | 0.561 | 7.6 | 13.21 |
| 27 | 46.710 | 5.777 | | | | | |
| 28 | 99.550 | 6.168 | 1.497 | 81.61 | 0.539 | −5.9 | 13.44 |
| 29 | −85.822 | 0.300 | | | | | |
| 30 | 72.374 | 6.149 | 1.497 | 81.61 | 0.539 | −5.9 | 13.29 |
| 31 | −135.245 | 9.300 | | | | | |
| 32 | INF | 70.000 | 1.5168 | 64.2 | | | |
| 33 | INF | 3.000 | | | | | |
| 34 | INF | 3.000 | 1.50847 | 61.19 | | | |
| 35 | INF | 2.500 | | | | | |

[Various data]

| | |
|---|---|
| f | 17.1 |
| Fno | 2.5 |
| Y'max | 10.9 |
| L | 2438 |
| B | −145.1 |

[Single lens data]

| lens | start surface | focal length |
|---|---|---|
| 1 | 1 | −111.259 |
| 2 | 3 | −103.630 |
| 3 | 5 | 79.624 |
| 4 | 7 | −81.680 |
| 5 | 9 | −73.076 |
| 6 | 11 | 39.074 |
| 7 | 13 | −166.693 |
| 8 | 15 | −37.442 |
| 9 | 17 | 56.180 |
| 10 | 20 | 80.135 |
| 11 | 22 | −45.399 |
| 12 | 24 | 63.476 |
| 13 | 26 | −92.169 |
| 14 | 28 | 93.770 |
| 15 | 30 | 95.801 |

EXAMPLE 5

The unit is mm.

[Surface data]

| s | r | d | Nd | Vd | P | dN/dT (×10⁻⁶) | Fx |
|---|---|---|---|---|---|---|---|
| 1 | 69.577 | 3.200 | 1.6968 | 55.46 | 0.543 | 3.8 | 3.36 |
| 2 | 35.806 | 12.599 | | | | | |
| 3 | 157.415 | 2.600 | 1.6968 | 55.46 | 0.543 | 3.8 | 3.73 |
| 4 | 52.294 | 23.110 | | | | | |
| 5 | 251.239 | 8.088 | 1.7859 | 43.93 | 0.561 | 7.6 | 5.47 |
| 6 | −75.779 | 0.700 | | | | | |
| 7 | 155.204 | 2.200 | 1.58913 | 61.25 | 0.540 | 3.5 | 5.46 |
| 8 | 35.478 | 13.511 | | | | | |
| 9 | −76.268 | 4.000 | 1.58913 | 61.25 | 0.540 | 3.5 | 6.55 |
| 10 | 73.145 | 8.925 | | | | | |
| 11 | 50.075 | 14.000 | 1.5168 | 64.2 | 0.534 | 2.5 | 8.76 |
| 12 | −30.345 | 0.010 | | | | | |
| 13 | −30.345 | 3.344 | 1.7552 | 27.53 | 0.609 | 1.4 | 9.07 |
| 14 | −42.752 | 18.364 | | | | | |
| 15 | −37.558 | 2.493 | 1.497 | 81.61 | 0.539 | −5.9 | 9.15 |
| 16 | 37.787 | 5.671 | | | | | |
| 17 | 56.897 | 6.034 | 1.62004 | 36.3 | 0.587 | 1.9 | 10.80 |
| 18 | −83.594 | 31.155 | | | | | |
| 19 (stop) | INF | 30.375 | | | | | |
| 20 | 745.999 | 6.874 | 1.48749 | 70.44 | 0.530 | −1.6 | 12.97 |
| 21 | −35.966 | 3.772 | | | | | |
| 22 | −30.668 | 2.007 | 1.8061 | 40.72 | 0.567 | 5.6 | 12.77 |
| 23 | −275.287 | 0.578 | | | | | |
| 24 | 73.062 | 8.393 | 1.45847 | 67.72 | 0.524 | 9.9 | 13.31 |
| 25 | −48.290 | 0.500 | | | | | |
| 26 | 198.979 | 2.000 | 1.7859 | 43.93 | 0.561 | 7.6 | 13.11 |
| 27 | 47.507 | 5.550 | | | | | |
| 28 | 97.178 | 6.296 | 1.497 | 81.61 | 0.539 | −5.9 | 13.44 |
| 29 | −82.600 | 0.300 | | | | | |
| 30 | 69.063 | 6.381 | 1.497 | 81.61 | 0.539 | −5.9 | 13.30 |
| 31 | −127.704 | 9.300 | | | | | |
| 32 | INF | 70.000 | 1.5168 | 64.2 | | | |
| 33 | INF | 3.000 | | | | | |
| 34 | INF | 3.000 | 1.50847 | 61.19 | | | |
| 35 | INF | 2.500 | | | | | |

[Various data]

| | |
|---|---|
| f | 17.1 |
| Fno | 2.5 |
| Y'max | 10.9 |
| L | 2438 |
| B | −145.1 |

[Single lens data]

| lens | start surface | focal length |
|---|---|---|
| 1 | 1 | −110.158 |
| 2 | 3 | −113.535 |
| 3 | 5 | 74.894 |
| 4 | 7 | −78.602 |
| 5 | 9 | −62.753 |
| 6 | 11 | 38.867 |
| 7 | 13 | −156.616 |
| 8 | 15 | −37.488 |
| 9 | 17 | 55.513 |
| 10 | 20 | 70.588 |
| 11 | 22 | −42.973 |
| 12 | 24 | 64.824 |
| 13 | 26 | −79.873 |
| 14 | 28 | 90.894 |
| 15 | 30 | 91.168 |

EXAMPLE 6

The unit is mm.

[Surface data]

| s | r | d | Nd | Vd | P | dN/dT (×10⁻⁶) | Fx |
|---|---|---|---|---|---|---|---|
| 1 | 110.289 | 2.400 | 1.62299 | 58.12 | 0.544 | 2.9 | 8.53 |
| 2 | 37.759 | 8.293 | | | | | |
| 3 | −3413.137 | 4.516 | 1.7433 | 49.22 | 0.550 | 7.9 | 9.38 |
| 4 | −71.883 | 5.349 | | | | | |
| 5 | 1 × 10³⁰ | 1.800 | 1.58913 | 61.25 | 0.540 | 3.5 | 9.40 |
| 6 | 37.628 | 12.536 | | | | | |
| 7 | −29.925 | 2.800 | 1.62299 | 58.12 | 0.544 | 2.9 | 11.86 |
| 8 | −83.330 | 3.271 | | | | | |
| 9 | −318.438 | 3.308 | 1.62004 | 36.3 | 0.587 | 1.9 | 14.15 |
| 10 | 67.978 | 0.010 | | | | | |
| 11 | 67.978 | 8.027 | 1.6968 | 55.46 | 0.543 | 3.8 | 14.93 |
| 12 | −48.533 | 1.000 | | | | | |
| 13 | 82.672 | 4.443 | 1.58913 | 61.25 | 0.540 | 3.5 | 15.36 |
| 14 | −217.875 | 39.605 | | | | | |
| 15 (stop) | INF | 5.923 | | | | | |
| 16 | −94.694 | 1.800 | 1.58913 | 61.25 | 0.540 | 3.5 | 12.40 |
| 17 | 41.394 | 4.470 | | | | | |
| 18 | 50.378 | 4.455 | 1.7552 | 27.53 | 0.609 | 1.4 | 13.32 |
| 19 | −1548.447 | 4.512 | | | | | |
| 20 | −214.785 | 2.000 | 1.6727 | 32.17 | 0.596 | 1.2 | 13.30 |
| 21 | 56.061 | 6.462 | | | | | |
| 22 | 68.281 | 7.451 | 1.45847 | 67.72 | 0.524 | 9.9 | 14.86 |
| 23 | −68.281 | 7.461 | | | | | |
| 24 | 69.343 | 9.761 | 1.497 | 81.61 | 0.539 | −5.9 | 14.75 |
| 25 | −69.343 | 3.089 | | | | | |
| 26 | −78.977 | 2.200 | 1.8061 | 40.72 | 0.567 | 5.6 | 13.43 |
| 27 | 57.228 | 4.500 | | | | | |
| 28 | 114.685 | 7.055 | 1.497 | 81.61 | 0.539 | −5.9 | 13.79 |
| 29 | −67.444 | 0.419 | | | | | |
| 30 | 61.878 | 7.107 | 1.497 | 81.61 | 0.539 | −5.9 | 13.61 |
| 31 | −172.483 | 9.500 | | | | | |
| 32 | INF | 70.000 | 1.5168 | 64.2 | | | |
| 33 | INF | 3.000 | | | | | |
| 34 | INF | 3.000 | 1.50847 | 61.19 | | | |
| 35 | INF | 0.500 | | | | | |

[Various data]

| | |
|---|---|
| f | 42.4 |
| Fno | 2.5 |
| Y'max | 13.3 |
| L | 4572 |
| B | −108.8 |

[Single lens data]

| lens | start surface | focal length |
|---|---|---|
| 1 | 1 | −93.349 |
| 2 | 3 | 98.731 |
| 3 | 5 | −63.871 |
| 4 | 7 | −76.488 |
| 5 | 9 | −90.053 |
| 6 | 11 | 41.821 |
| 7 | 13 | 102.289 |
| 8 | 16 | −48.653 |
| 9 | 18 | 64.683 |
| 10 | 20 | −65.892 |
| 11 | 22 | 75.766 |
| 12 | 24 | 71.430 |
| 13 | 26 | −40.870 |
| 14 | 28 | 86.564 |
| 15 | 30 | 92.562 |

EXAMPLE 7

The unit is mm.

[Surface data]

| s | r | d | Nd | Vd | P | dN/dT (×10⁻⁶) | Fx |
|---|---|---|---|---|---|---|---|
| 1 | 110.415 | 2.400 | 1.62299 | 58.12 | 0.544 | 2.9 | 8.50 |
| 2 | 37.258 | 8.758 | | | | | |
| 3 | −1641.382 | 4.473 | 1.7433 | 49.22 | 0.550 | 7.9 | 9.42 |
| 4 | −73.872 | 7.966 | | | | | |
| 5 | 1 × 10³⁰ | 2.477 | 1.58913 | 61.25 | 0.540 | 3.5 | 9.51 |
| 6 | 34.291 | 11.282 | | | | | |
| 7 | −29.398 | 2.229 | 1.62299 | 58.12 | 0.544 | 2.9 | 11.91 |
| 8 | −82.521 | 2.166 | | | | | |
| 9 | −993.445 | 2.000 | 1.62004 | 36.3 | 0.587 | 1.9 | 13.79 |
| 10 | 55.505 | 0.010 | | | | | |
| 11 | 55.505 | 8.850 | 1.6968 | 55.46 | 0.543 | 3.8 | 14.69 |
| 12 | −46.766 | 1.025 | | | | | |
| 13 | 87.520 | 4.618 | 1.58913 | 61.25 | 0.540 | 3.5 | 15.13 |
| 14 | −160.176 | 37.379 | | | | | |
| 15 (stop) | INF | 4.399 | | | | | |
| 16 | −104.346 | 1.800 | 1.58913 | 61.25 | 0.540 | 3.5 | 12.29 |
| 17 | 40.945 | 5.185 | | | | | |
| 18 | 51.217 | 6.044 | 1.7552 | 27.53 | 0.609 | 1.4 | 13.29 |
| 19 | −3122.804 | 6.410 | | | | | |
| 20 | −191.868 | 2.000 | 1.6727 | 32.17 | 0.596 | 1.2 | 13.21 |
| 21 | 57.653 | 7.147 | | | | | |
| 22 | 70.038 | 7.292 | 1.497 | 81.61 | 0.539 | −5.9 | 14.84 |
| 23 | −70.038 | 7.403 | | | | | |
| 24 | 72.603 | 8.317 | 1.45847 | 67.72 | 0.524 | 9.9 | 14.58 |
| 25 | −72.603 | 3.021 | | | | | |
| 26 | −85.577 | 2.200 | 1.8061 | 40.72 | 0.567 | 5.6 | 13.40 |
| 27 | 57.083 | 4.531 | | | | | |
| 28 | 115.818 | 6.961 | 1.497 | 81.61 | 0.539 | −5.9 | 13.77 |
| 29 | −68.794 | 0.300 | | | | | |
| 30 | 60.065 | 7.254 | 1.497 | 81.61 | 0.539 | −5.9 | 13.61 |
| 31 | −173.902 | 9.625 | | | | | |
| 32 | INF | 70.000 | 1.5168 | 64.2 | | | |
| 33 | INF | 3.000 | | | | | |
| 34 | INF | 3.000 | 1.50847 | 61.19 | | | |
| 35 | INF | 0.500 | | | | | |

[Various data]

| | |
|---|---|
| f | 42.4 |
| Fno | 2.5 |
| Y'max | 13.3 |
| L | 4572 |
| B | −108.8 |

[Single lens data]

| lens | start surface | focal length |
|---|---|---|
| 1 | 1 | −91.414 |
| 2 | 3 | 103.942 |
| 3 | 5 | −58.206 |
| 4 | 7 | −74.501 |
| 5 | 9 | −84.719 |
| 6 | 11 | 37.767 |
| 7 | 13 | 96.736 |
| 8 | 16 | −49.686 |
| 9 | 18 | 66.779 |
| 10 | 20 | −65.690 |
| 11 | 22 | 71.700 |
| 12 | 24 | 80.631 |
| 13 | 26 | −42.189 |
| 14 | 28 | 87.939 |
| 15 | 30 | 90.763 |

EXAMPLE 8

The unit is mm.

[Surface data]

| s | r | d | Nd | Vd | P | dN/dT (×10⁻⁶) | Fx |
|---|---|---|---|---|---|---|---|
| 1 | 118.829 | 2.400 | 1.62299 | 58.12 | 0.544 | 2.9 | 8.52 |
| 2 | 37.042 | 8.244 | | | | | |
| 3 | 593.025 | 4.894 | 1.7433 | 49.22 | 0.550 | 7.9 | 9.44 |
| 4 | −76.656 | 7.627 | | | | | |
| 5 | 1 × 10³⁰ | 2.792 | 1.58913 | 61.25 | 0.540 | 3.5 | 9.44 |
| 6 | 33.014 | 11.285 | | | | | |
| 7 | −28.745 | 2.800 | 1.62299 | 58.12 | 0.544 | 2.9 | 12.00 |
| 8 | −91.622 | 1.896 | | | | | |
| 9 | −766.965 | 2.000 | 1.62004 | 36.3 | 0.587 | 1.9 | 13.83 |
| 10 | 54.506 | 0.010 | | | | | |
| 11 | 54.506 | 9.187 | 1.6968 | 55.46 | 0.543 | 3.8 | 14.79 |
| 12 | −44.154 | 1.000 | | | | | |
| 13 | 84.903 | 4.451 | 1.58913 | 61.25 | 0.540 | 3.5 | 15.23 |
| 14 | −201.430 | 40.443 | | | | | |
| 15 (stop) | INF | 4.051 | | | | | |
| 16 | −94.139 | 1.800 | 1.58913 | 61.25 | 0.540 | 3.5 | 12.40 |
| 17 | 42.959 | 4.838 | | | | | |
| 18 | 52.565 | 4.131 | 1.7552 | 27.53 | 0.609 | 1.4 | 13.37 |
| 19 | −1135.575 | 6.530 | | | | | |
| 20 | −162.677 | 2.000 | 1.6727 | 32.17 | 0.596 | 1.2 | 13.36 |
| 21 | 54.801 | 4.528 | | | | | |
| 22 | 61.693 | 8.132 | 1.45847 | 67.72 | 0.524 | 9.9 | 14.70 |
| 23 | −61.693 | 7.452 | | | | | |
| 24 | 67.072 | 8.602 | 1.45847 | 67.72 | 0.524 | 9.9 | 14.58 |
| 25 | −67.072 | 3.107 | | | | | |
| 26 | −75.577 | 2.200 | 1.8061 | 40.72 | 0.567 | 5.6 | 13.40 |
| 27 | 57.490 | 4.209 | | | | | |
| 28 | 100.835 | 7.635 | 1.497 | 81.61 | 0.539 | −5.9 | 13.88 |
| 29 | −62.605 | 0.394 | | | | | |
| 30 | 59.356 | 7.038 | 1.497 | 81.61 | 0.539 | −5.9 | 13.69 |
| 31 | −212.198 | 9.845 | | | | | |
| 32 | INF | 70.000 | 1.5168 | 64.2 | | | |
| 33 | INF | 3.000 | | | | | |
| 34 | INF | 3.000 | 1.50847 | 61.19 | | | |
| 35 | INF | 0.500 | | | | | |

[Various data]

| | |
|---|---|
| f | 42.4 |
| Fno | 2.5 |
| Y'max | 13.3 |
| L | 4572 |
| B | −108.8 |

[Single lens data]

| lens | start surface | focal length |
|---|---|---|
| 1 | 1 | −87.371 |
| 2 | 3 | 91.610 |
| 3 | 5 | −56.039 |
| 4 | 7 | −68.405 |
| 5 | 9 | −81.997 |
| 6 | 11 | 36.400 |
| 7 | 13 | 101.970 |
| 8 | 16 | −49.828 |
| 9 | 18 | 66.624 |
| 10 | 20 | −60.712 |
| 11 | 22 | 68.705 |
| 12 | 24 | 74.652 |
| 13 | 26 | −40.210 |
| 14 | 28 | 78.940 |
| 15 | 30 | 94.134 |

The individual lens configuration data of Comparison Example 1 corresponding to Examples 1 to 3 described above, Comparison Example 2 corresponding to Examples 4 and 5 described above, and Comparison Example 3 corresponding to Examples 6 and 8 are shown as below. Cross sectional shapes of the optical systems of Comparison Examples 1 to 3 correspond respectively to the FIGS. 1 to 3. Note that each of Comparison Examples 1 to 3 is an optical system including the first positive lens but does not include the second positive lens.

COMPARISON EXAMPLE 1

The unit is mm.

[Surface data]

| s | r | d | Nd | Vd | P | dN/dT (×10⁻⁶) | Fx |
|---|---|---|---|---|---|---|---|
| 1 | 66.332 | 10.816 | 1.651597 | 58.55 | 0.543 | 2.2 | 4.83 |
| 2 | 496.073 | 0.200 | | | | | |
| 3 | 115.551 | 5.092 | 1.496999 | 81.54 | 0.537 | −6.2 | 4.60 |
| 4 | 33.232 | 12.819 | | | | | |
| 5 | −371.754 | 3.018 | 1.496999 | 81.54 | 0.537 | −6.2 | 4.75 |
| 6 | 41.485 | 7.978 | | | | | |
| 7 | −94.879 | 2.477 | 1.496999 | 81.54 | 0.537 | −6.2 | 5.63 |
| 8 | 49.847 | 6.788 | | | | | |
| 9 | −109.702 | 5.556 | 1.651597 | 58.55 | 0.543 | 2.2 | 7.41 |
| 10 | −42.704 | 37.314 | | | | | |
| 11 | 34.776 | 7.252 | 1.487490 | 70.23 | 0.530 | −0.7 | 11.37 |
| 12 | −45.757 | 0.210 | | | | | |
| 13 (stop) | INF | 4.111 | | | | | |
| 14 | −29.032 | 1.556 | 1.518229 | 58.9 | 0.546 | 0.7 | 10.39 |
| 15 | 31.200 | 1.889 | | | | | |
| 16 | 30.047 | 6.601 | 1.487490 | 70.23 | 0.530 | −0.7 | 10.84 |
| 17 | −29.031 | 5.907 | | | | | |
| 18 | −22.825 | 1.538 | 1.518229 | 58.9 | 0.546 | 0.7 | 9.73 |
| 19 | 36.027 | 2.291 | | | | | |
| 20 | 39.665 | 7.146 | 1.496999 | 81.54 | 0.537 | −6.2 | 10.39 |
| 21 | −34.380 | 2.494 | | | | | |
| 22 | 272.445 | 4.498 | 1.496999 | 81.54 | 0.537 | −6.2 | 9.96 |
| 23 | −38.270 | 4.579 | | | | | |
| 24 | −26.617 | 1.921 | 1.518229 | 58.9 | 0.546 | 0.7 | 8.54 |
| 25 | 33.968 | 3.405 | | | | | |
| 26 | 47.573 | 6.586 | 1.496999 | 81.54 | 0.537 | −6.2 | 8.57 |
| 27 | −49.138 | 8.553 | | | | | |
| 28 | 53.125 | 4.764 | 1.496999 | 81.54 | 0.537 | −6.2 | 7.36 |
| 29 | −231.356 | 7.660 | | | | | |
| 30 | INF | 30.000 | 1.516800 | 64.2 | | | |
| 31 | INF | 3.000 | | | | | |
| 32 | INF | 3.000 | 1.508470 | 61.19 | | | |
| 33 | INF | 1.500 | | | | | |

[Various data]

| | |
|---|---|
| f | 28.8 |
| Fno | 2.5 |
| Y'max | 12.3 |
| L | 314 |
| B | −13.1 |

[Single lens data]

| lens | start surface | focal length |
|---|---|---|
| 1 | 1 | 116.357 |
| 2 | 3 | −95.825 |
| 3 | 5 | −74.909 |
| 4 | 7 | −65.381 |
| 5 | 9 | 103.912 |
| 6 | 11 | 41.764 |
| 7 | 14 | −28.765 |
| 8 | 16 | 31.439 |
| 9 | 18 | −26.724 |
| 10 | 20 | 38.283 |
| 11 | 22 | 67.844 |
| 12 | 24 | −28.488 |
| 13 | 26 | 49.760 |
| 14 | 28 | 87.417 |

In Comparison Example 1, the lenses L10, L11, L13 and L14 are made of material having low dispersion and large anomalous dispersion characteristic as the first positive lenses, and are disposed closer to the contraction side than the aperture stop ST.

COMPARISON EXAMPLE 2

The unit is mm.

[Surface data]

| s | r | d | Nd | Vd | P | dN/dT (×10⁻⁶) | Fx |
|---|---|---|---|---|---|---|---|
| 1 | 77.823 | 3.200 | 1.6968 | 55.46 | 0.543 | 3.8 | 3.36 |
| 2 | 36.850 | 12.345 | | | | | |
| 3 | 189.588 | 2.600 | 1.6968 | 55.46 | 0.543 | 3.8 | 3.76 |
| 4 | 52.187 | 27.097 | | | | | |
| 5 | 438.691 | 7.335 | 1.7859 | 43.93 | 0.561 | 7.6 | 5.93 |
| 6 | −69.754 | 0.700 | | | | | |
| 7 | 219.803 | 2.200 | 1.58913 | 61.25 | 0.540 | 3.5 | 5.92 |
| 8 | 39.039 | 19.038 | | | | | |
| 9 | −106.349 | 2.000 | 1.58913 | 61.25 | 0.540 | 3.5 | 7.31 |
| 10 | 76.761 | 6.667 | | | | | |
| 11 | 49.068 | 14.000 | 1.5168 | 64.2 | 0.534 | 2.5 | 9.09 |
| 12 | −31.302 | 0.010 | | | | | |
| 13 | −31.302 | 3.000 | 1.7552 | 27.53 | 0.609 | 1.4 | 9.36 |
| 14 | −43.498 | 16.819 | | | | | |
| 15 | −35.511 | 2.500 | 1.497 | 81.61 | 0.539 | −5.9 | 9.33 |
| 16 | 39.938 | 3.847 | | | | | |
| 17 | 54.077 | 5.045 | 1.62004 | 36.3 | 0.587 | 1.9 | 10.45 |
| 18 | −90.028 | 32.250 | | | | | |
| 19 (stop) | INF | 31.076 | | | | | |
| 20 | −720.722 | 5.637 | 1.48749 | 70.44 | 0.530 | −1.6 | 12.80 |
| 21 | −37.613 | 3.899 | | | | | |
| 22 | −31.049 | 2.000 | 1.8061 | 40.72 | 0.567 | 5.6 | 12.80 |
| 23 | −198.718 | 0.500 | | | | | |
| 25 | −49.886 | 0.500 | | | | | |
| 26 | 128.679 | 2.000 | 1.7859 | 43.93 | 0.561 | 7.6 | 13.19 |
| 27 | 46.317 | 6.248 | | | | | |
| 28 | 101.126 | 6.168 | 1.497 | 81.61 | 0.539 | −5.9 | 13.45 |
| 29 | −84.917 | 0.300 | | | | | |
| 30 | 73.808 | 6.092 | 1.497 | 81.61 | 0.539 | −5.9 | 13.29 |
| 31 | −135.219 | 9.300 | | | | | |
| 32 | INF | 70.000 | 1.5168 | 64.2 | | | |
| 33 | INF | 3.000 | | | | | |
| 34 | INF | 3.000 | 1.50847 | 61.19 | | | |
| 35 | INF | 2.500 | | | | | |

[Various data]

| | |
|---|---|
| f | 17.1 |
| Fno | 2.5 |
| Y'max | 10.9 |
| L | 2438 |
| B | −145.1 |

[Single lens data]

| lens | start surface | focal length |
|---|---|---|
| 1 | 1 | −103.778 |
| 2 | 3 | −104.151 |
| 3 | 5 | 77.070 |
| 4 | 7 | −80.942 |
| 5 | 9 | −75.369 |
| 6 | 11 | 39.312 |
| 7 | 13 | −165.335 |
| 8 | 15 | −37.410 |
| 9 | 17 | 55.227 |
| 10 | 20 | 81.186 |
| 11 | 22 | −45.895 |
| 12 | 24 | 63.459 |
| 13 | 26 | −93.072 |
| 14 | 28 | 93.906 |
| 15 | 30 | 97.008 |

In Comparison Example 2, the lenses L12, L14 and L15 are made of material having low dispersion and large anomalous dispersion characteristic as the first positive lenses, and are disposed closer to the contraction side than the aperture stop ST.

COMPARISON EXAMPLE 3

The unit is mm.

[Surface data]

| s | r | d | Nd | Vd | P | dN/dT (×10⁻⁶) | Fx |
|---|---|---|---|---|---|---|---|
| 1 | 108.273 | 2.400 | 1.62299 | 58.12 | 0.544 | 2.9 | 8.53 |
| 2 | 38.011 | 8.834 | | | | | |
| 3 | −648.290 | 4.290 | 1.7433 | 49.22 | 0.550 | 7.9 | 9.42 |
| 4 | −73.127 | 7.166 | | | | | |
| 5 | 1 × 10³⁰ | 1.800 | 1.58913 | 61.25 | 0.540 | 3.5 | 9.52 |
| 6 | 36.735 | 12.253 | | | | | |
| 7 | −30.275 | 1.800 | 1.62299 | 58.12 | 0.544 | 2.9 | 11.85 |
| 8 | −79.183 | 3.648 | | | | | |
| 9 | −456.655 | 2.000 | 1.62004 | 36.3 | 0.587 | 1.9 | 14.09 |
| 10 | 64.469 | 0.010 | | | | | |
| 11 | 64.469 | 8.179 | 1.6968 | 55.46 | 0.543 | 3.8 | 14.89 |
| 12 | −48.596 | 1.558 | | | | | |
| 13 | 85.737 | 4.603 | 1.58913 | 61.25 | 0.540 | 3.5 | 15.38 |
| 14 | −168.973 | 36.958 | | | | | |
| 15 (stop) | INF | 6.508 | | | | | |
| 16 | −102.216 | 1.800 | 1.58913 | 61.25 | 0.540 | 3.5 | 12.32 |
| 17 | 40.278 | 5.039 | | | | | |
| 18 | 50.357 | 4.254 | 1.7552 | 27.53 | 0.609 | 1.4 | 13.32 |
| 19 | −1343.602 | 4.129 | | | | | |
| 20 | −214.698 | 2.000 | 1.6727 | 32.17 | 0.596 | 1.2 | 13.25 |
| 21 | 58.250 | 8.241 | | | | | |
| 22 | 74.724 | 6.908 | 1.497 | 81.61 | 0.539 | −5.9 | 14.96 |
| 23 | −74.724 | 9.705 | | | | | |
| 24 | 75.375 | 7.727 | 1.497 | 81.61 | 0.539 | −5.9 | 14.65 |
| 25 | −75.375 | 2.998 | | | | | |
| 26 | −90.075 | 2.200 | 1.8061 | 40.72 | 0.567 | 5.6 | 13.49 |
| 27 | 57.072 | 4.947 | | | | | |
| 28 | 136.801 | 6.432 | 1.497 | 81.61 | 0.539 | −5.9 | 13.78 |
| 29 | −73.054 | 0.300 | | | | | |
| 30 | 61.236 | 7.331 | 1.497 | 81.61 | 0.539 | −5.9 | 13.63 |
| 31 | −155.644 | 9.500 | | | | | |
| 32 | INF | 70.000 | 1.5168 | 64.2 | | | |
| 33 | INF | 3.000 | | | | | |
| 34 | INF | 3.000 | 1.50847 | 61.19 | | | |
| 35 | INF | 2.500 | | | | | |

[Various data]

| | |
|---|---|
| f | 42.4 |
| Fno | 2.5 |
| Y'max | 13.3 |
| L | 4572 |
| B | −108.8 |

[Single lens data]

| lens | start surface | focal length |
|---|---|---|
| 1 | 1 | −95.272 |
| 2 | 3 | 110.538 |
| 3 | 5 | −62.355 |
| 4 | 7 | −79.807 |
| 5 | 9 | −90.979 |
| 6 | 11 | 40.984 |
| 7 | 13 | 97.196 |
| 8 | 16 | −48.815 |
| 9 | 18 | 64.355 |
| 10 | 20 | −67.912 |
| 11 | 22 | 76.346 |
| 12 | 24 | 77.143 |

-continued

The unit is mm.

| | | |
|---|---|---|
| 13 | 26 | −43.053 |
| 14 | 28 | 96.806 |
| 15 | 30 | 89.426 |

In Comparison Example 3, the lens L11, L12, L14 and L15 are made of material having low dispersion and large anomalous dispersion characteristic as the first positive lens, and are disposed closer to the contraction side than the aperture stop ST.

Figure 13:
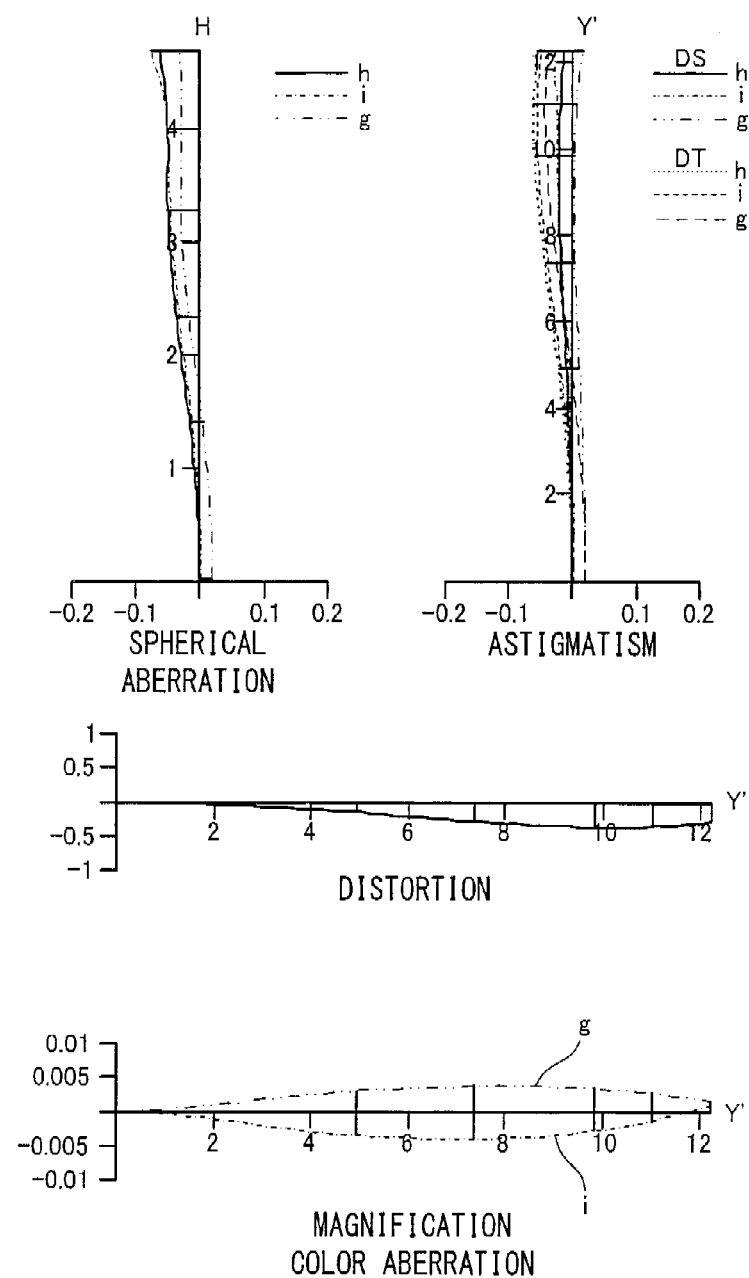
FIG. 13 is an aberration diagram of an optical system according to Comparison Example 1 of the present invention.
Figure 14:
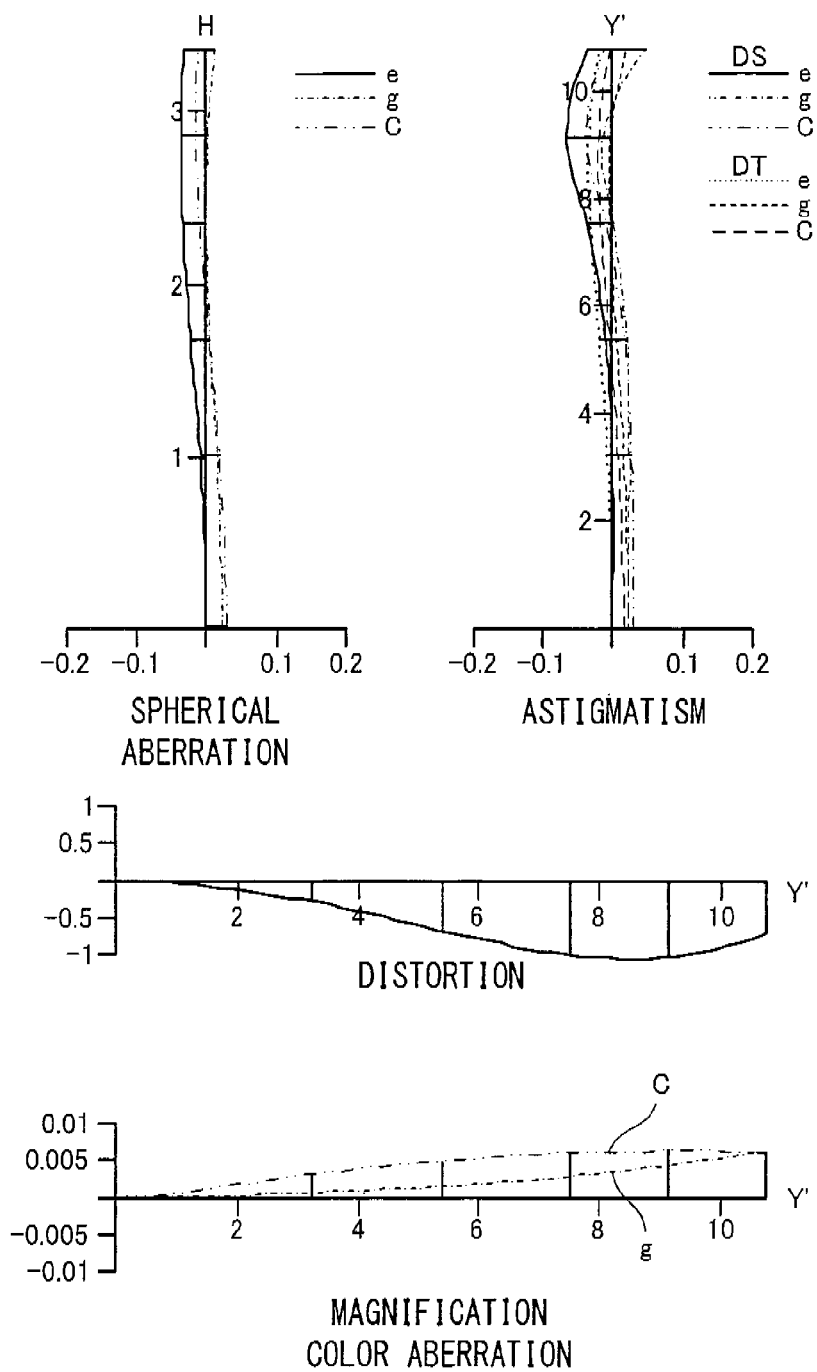
FIG. 14 is an aberration diagram of an optical system according to Comparison Example 2 of the present invention.
Figure 15:
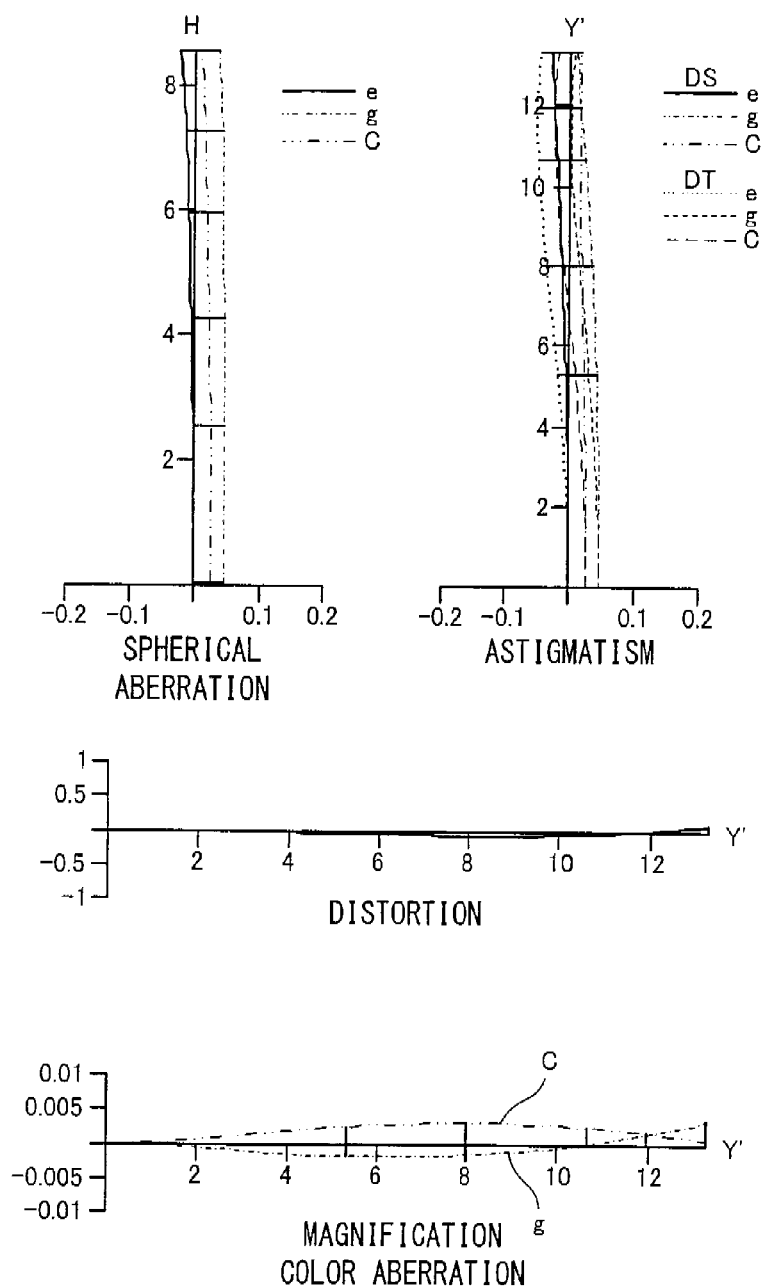
FIG. 15 is an aberration diagram of an optical system according to Comparison Example 3 of the present invention.

The aberration diagrams of Examples 1 to 8 are illustrated in FIGS. 5 to 12, and the aberration diagrams of Comparison Examples 1 to 3 are illustrated in FIGS. 13 to 15. Each aberration diagram indicates spherical aberration, astigmatism, distortion aberration and magnification color aberration. In each aberration diagram, a line h indicates an aberration amount at the h-line (wavelength 404.7 nm), a line i indicates an aberration amount at the i-line (wavelength 365.0 nm), a line g indicates an aberration amount at the g-line (wavelength 435.8 nm), a line e indicates an aberration amount at the e-line (wavelength 546.1 nm), and a line C indicates an aberration amount at the C-line (wavelength 656.3 nm).

Figure 5:
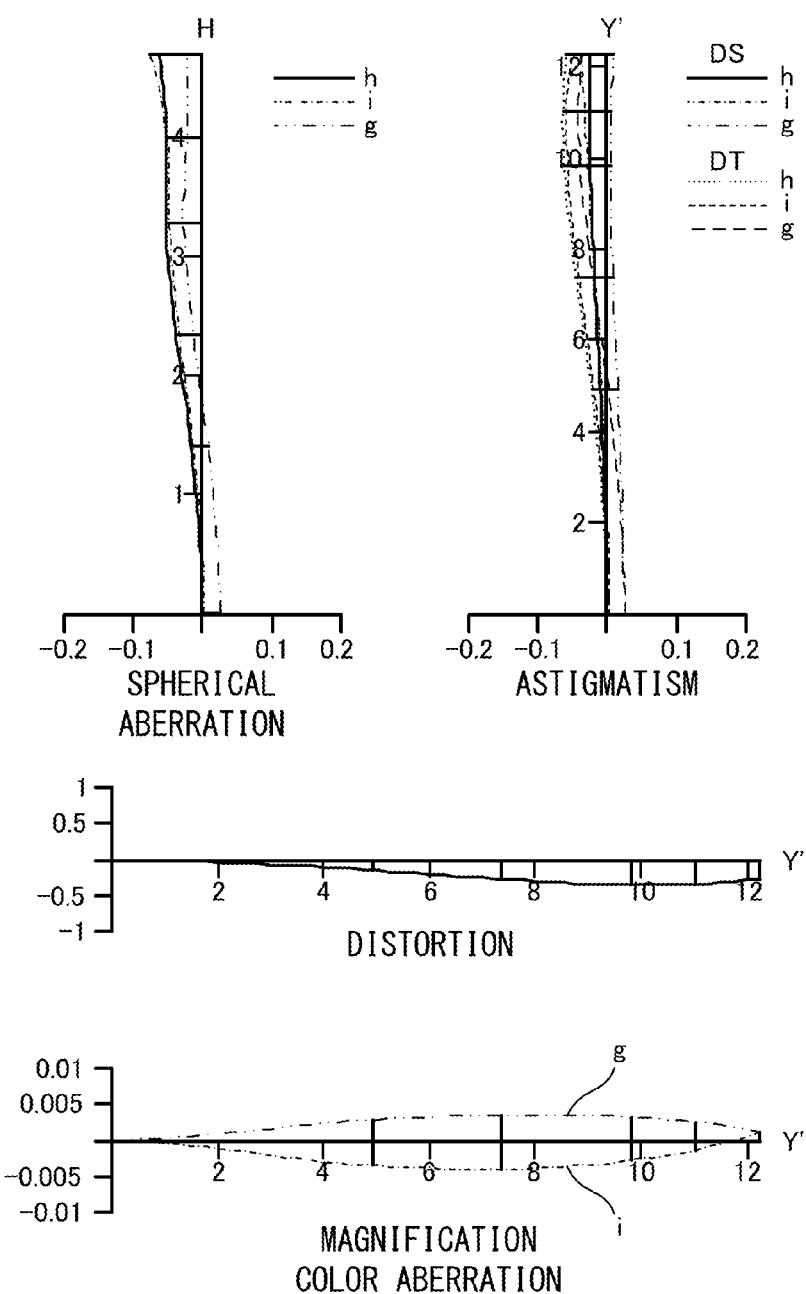
FIG. 5 is an aberration diagram of an optical system according to Example 1 of the present invention.
Figure 6:
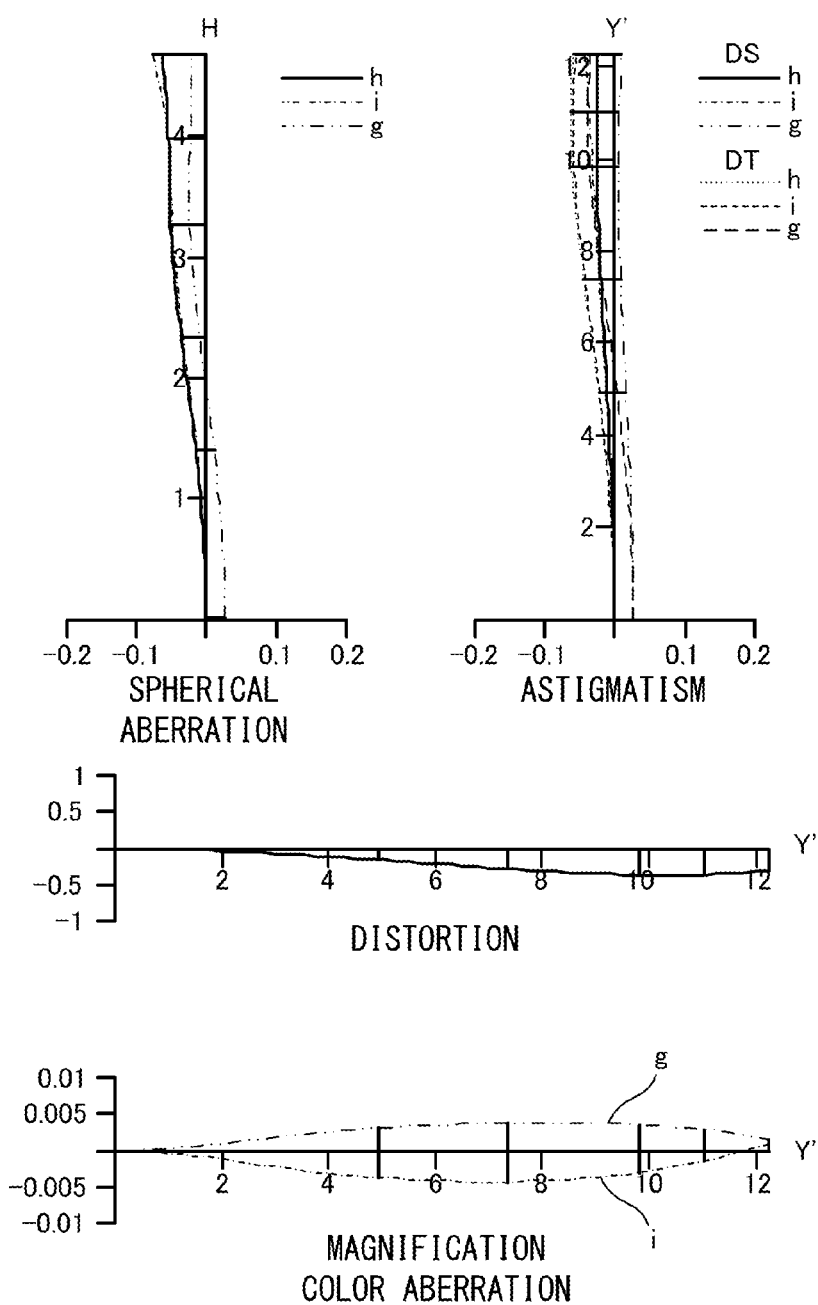
FIG. 6 is an aberration diagram of an optical system according to Example 2 of the present invention.
Figure 7:
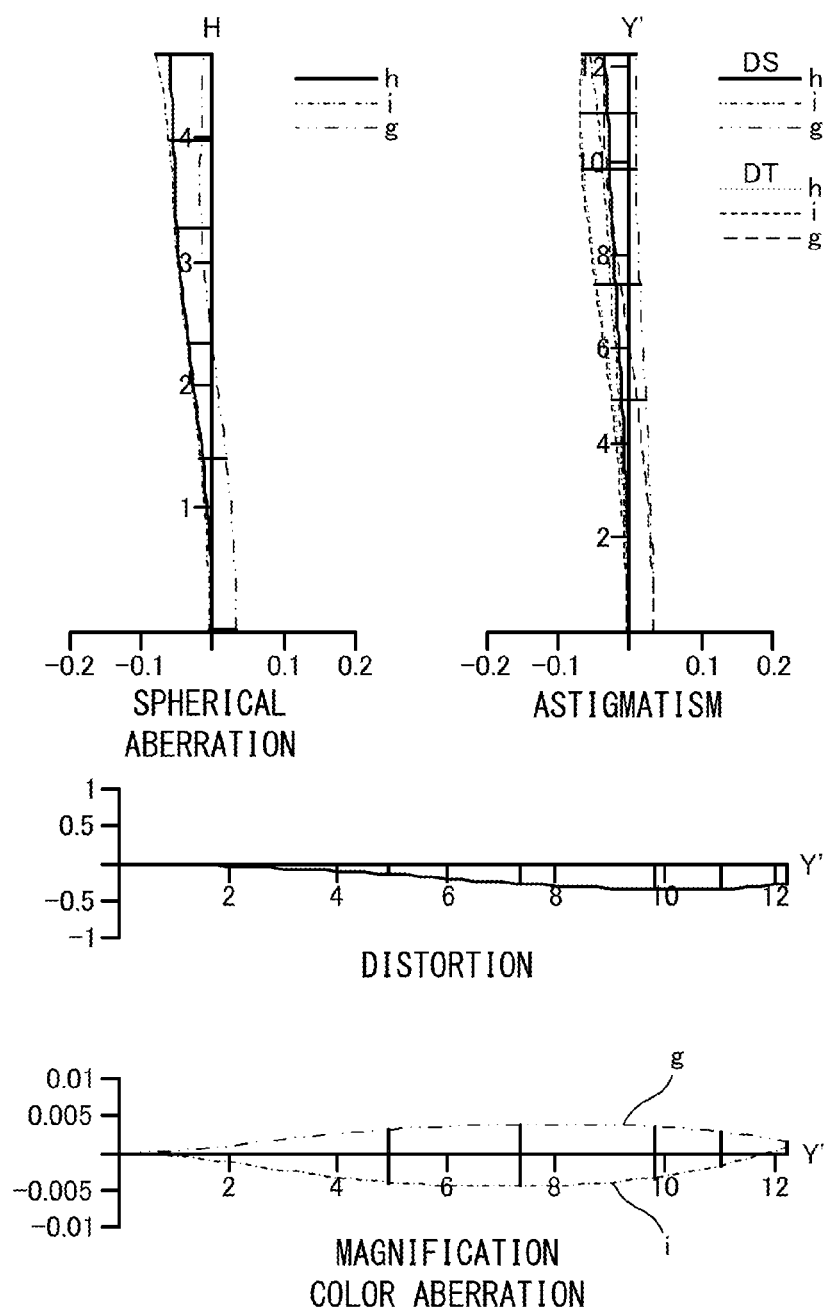
FIG. 7 is an aberration diagram of an optical system according to Example 3 of the present invention.
Figure 8:
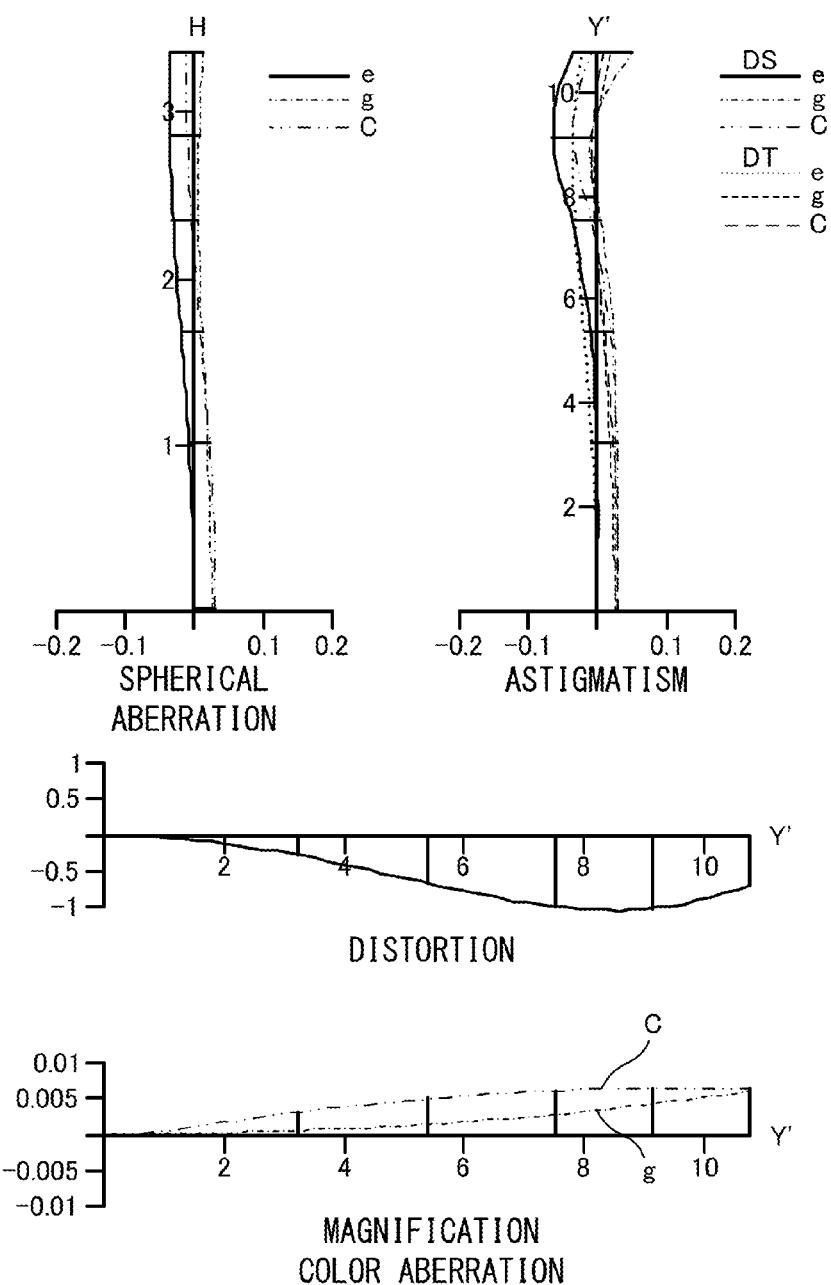
FIG. 8 is an aberration diagram of an optical system according to Example 4 of the present invention.
Figure 9:
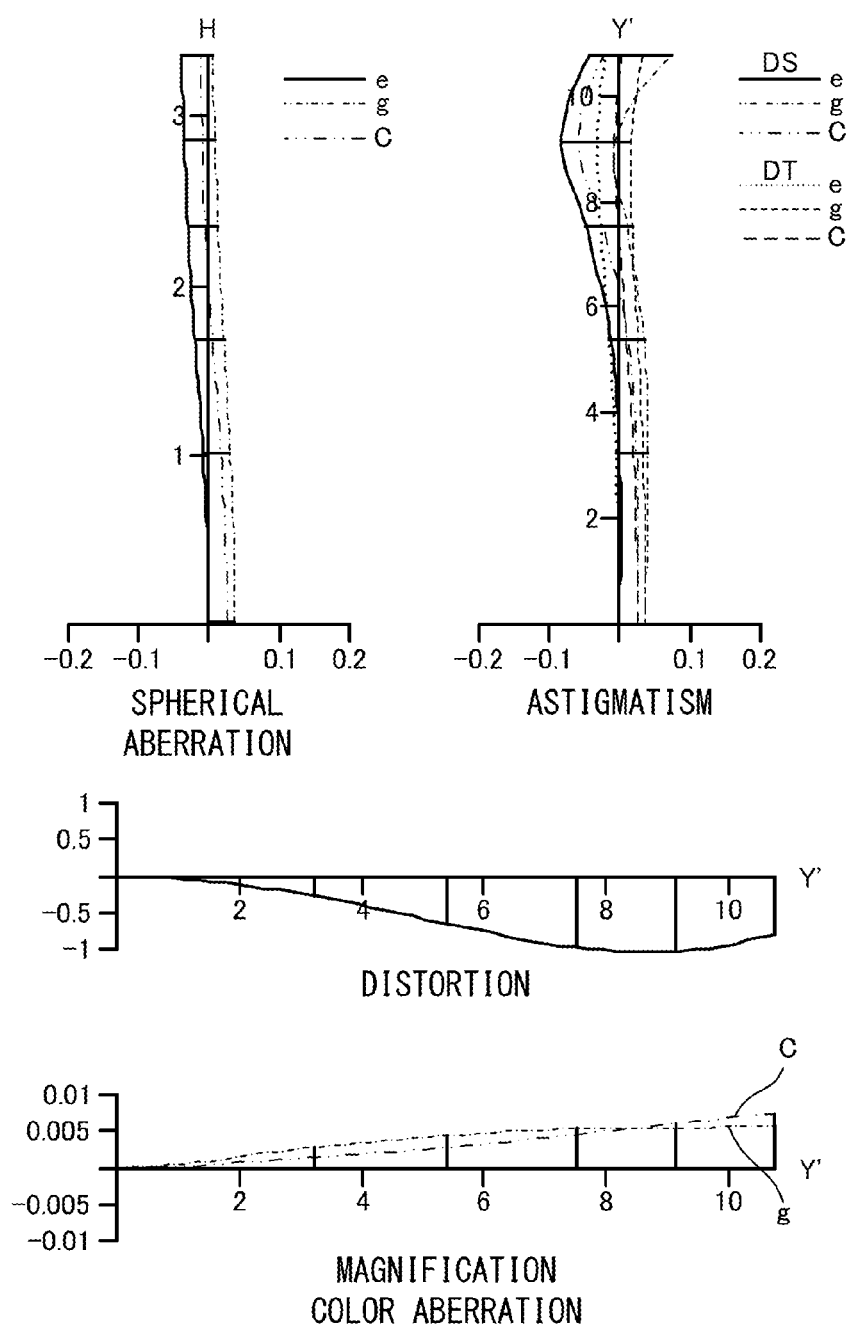
FIG. 9 is an aberration diagram of an optical system according to Example 5 of the present invention.
Figure 10:
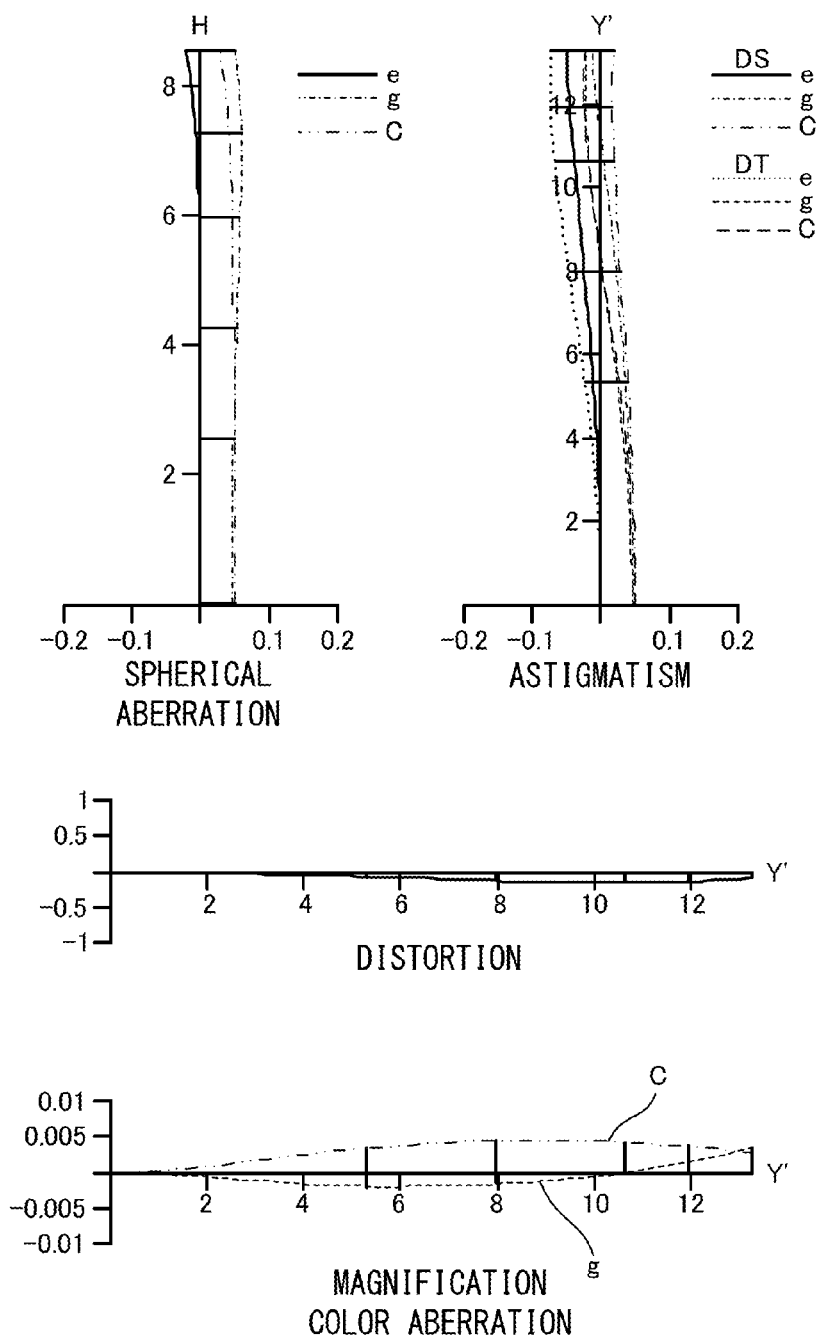
FIG. 10 is an aberration diagram of an optical system according to Example 6 of the present invention.
Figure 11:
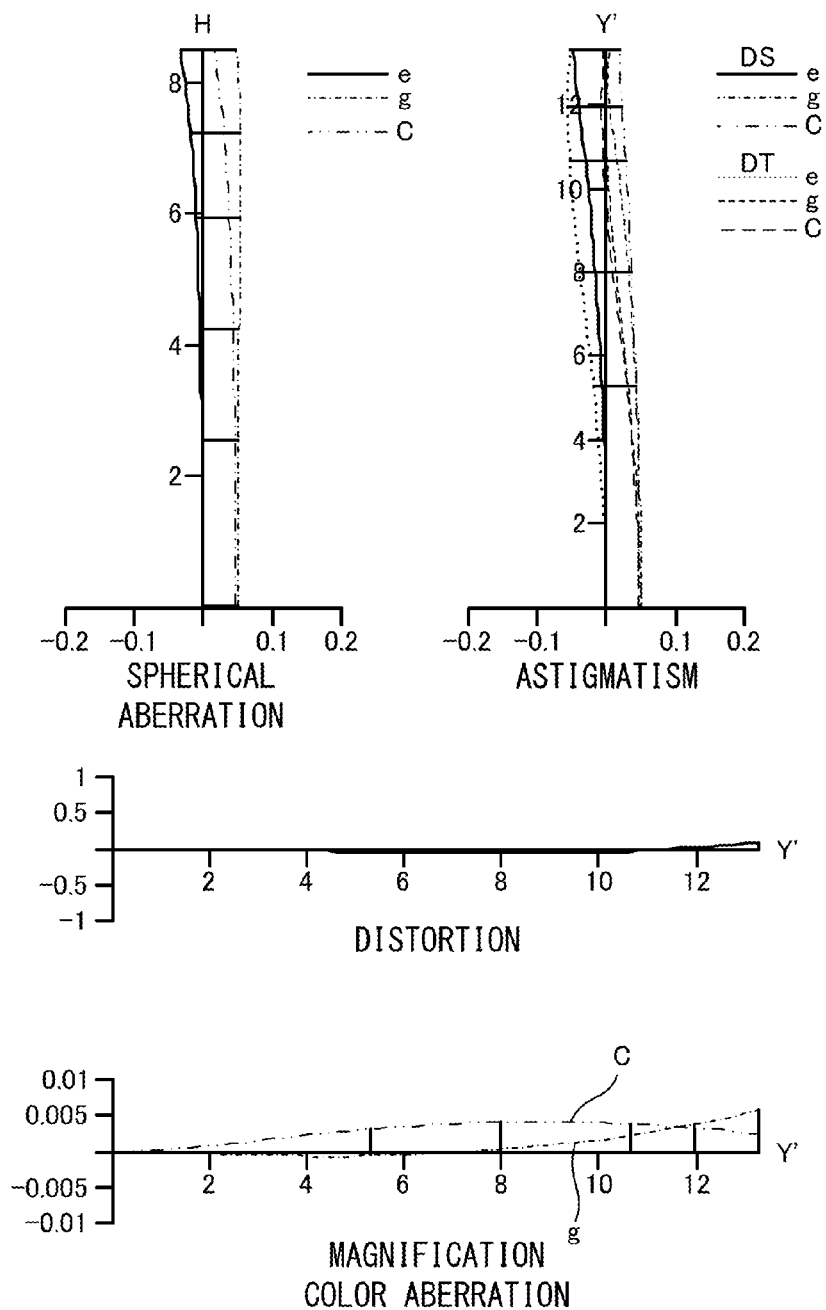
FIG. 11 is an aberration diagram of an optical system according to Example 7 of the present invention.
Figure 12:
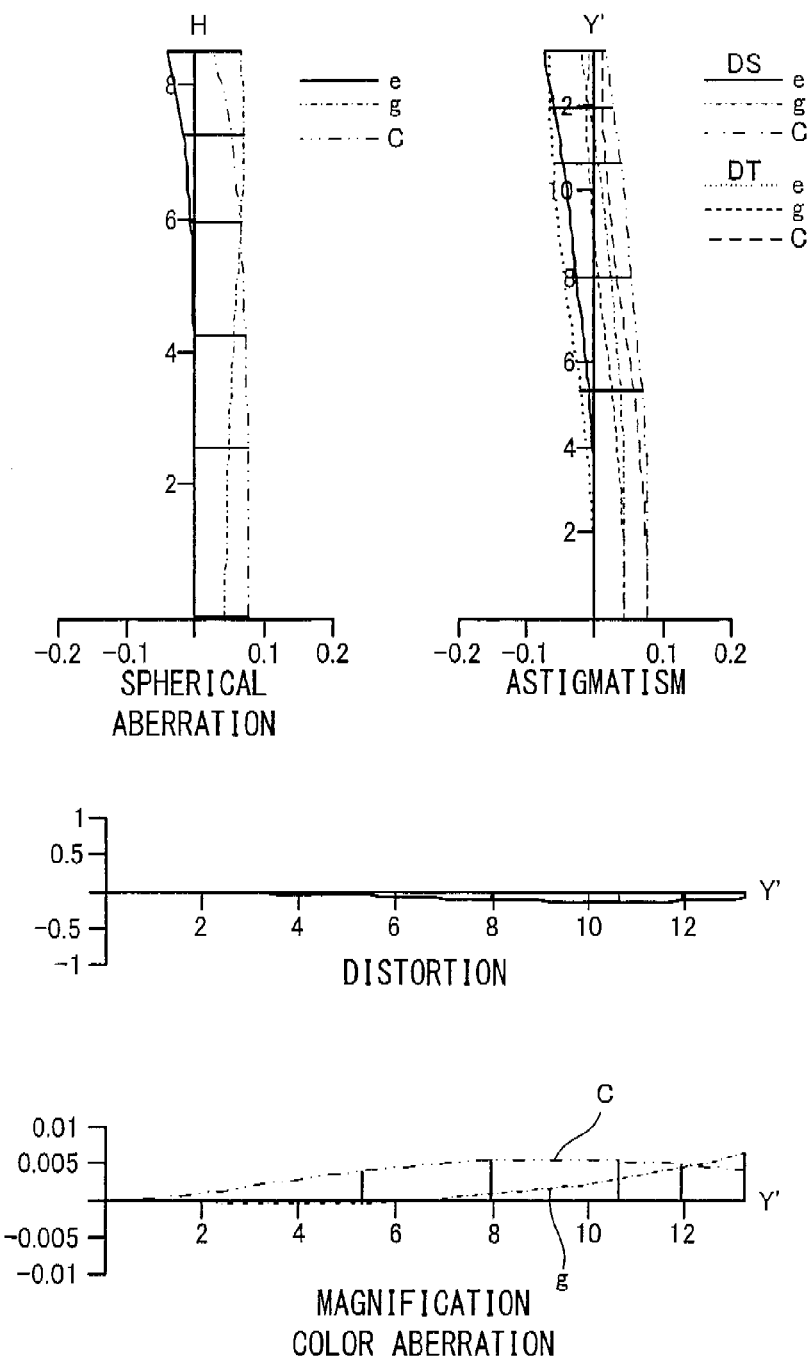
FIG. 12 is an aberration diagram of an optical system according to Example 8 of the present invention.

FIGS. 5 to 7 (Examples 1 to 3) and FIG. 13 (Comparison Example 1) are aberration diagrams of optical systems that are used in the near ultraviolet light range, and indicates aberrations at the h-line, the i-line and the g-line. On the other hand, FIGS. 8 to 12 (Examples 4 to 8) and FIGS. 14 and 15 (Comparison Examples 2 and 3) are aberration diagrams of optical systems that are used in the visible light range with the e-line as the middle range thereof, and indicates aberrations at the e-line, the g-line and the C-line. An astigmatism DS indicates aberration on the sagittal plane, and DT indicates aberration on the meridional plane. The unit of the horizontal axis indicating the spherical aberration or the astigmatism, as well as the unit of the vertical axis of the magnification color aberration or the distortion aberration is mm. H denotes a pupil height, and Y' denotes an image height.

In the individual examples and comparison examples, numerical values corresponding to the conditional expressions (1) to (8) and the focus shift are shown in Tables 1 to 4. The focus shifts (mm) shown in Tables 1 to 4 are shifts from a normal focus position when the temperature rises by 30 degrees centigrade from the room temperature, a shift to the contraction side is shown as a positive value, and a shift to the enlargement side is shown with a negative sign (−).

[Table 1]
[Table 2]
[Table 3]
[Table 4]

In Comparison Examples 1 to 3, as illustrated in the aberration diagrams of FIGS. 13 to 15, each aberration is appropriately corrected, but a focus shift due to temperature rise is large as shown in Table 4. On the other hand, in Examples 1 to 8, as illustrated in the aberration diagrams of FIGS. 5 to 12, each aberration is appropriately corrected, and a focus shift due to temperature rise is relatively small as illustrated in Tables 1 to 3, so that a good image can be always obtained.

The present invention can be used for an optical system and an image projection apparatus including the same. In particularly, the present invention can be used for an optical system which corrects color aberration and a focus shift due to temperature variation and an image projection apparatus including the same.

TABLE 1

| | EXAMPLE 1 | | | | | EXAMPLE 2 | | |
|---|---|---|---|---|---|---|---|---|
| | LENS | | | | | | | |
| | L6 SECOND POSITIVE LENS | L10 FIRST POSITIVE LENS | L11 FIRST POSITIVE LENS | L13 FIRST POSITIVE LENS | L14 FIRST POSITIVE LENS | L8 SECOND POSITIVE LENS | L10 FIRST POSITIVE LENS | L11 FIRST POSITIVE LENS |
| (1) Vd | 67.72 | 81.54 | 81.54 | 81.54 | 81.54 | 67.72 | 81.54 | 81.54 |
| (2), (4) 0.0018Vd + P | 0.6463 | 0.6842 | 0.6842 | 0.6842 | 0.6842 | 0.6463 | 0.6842 | 0.6842 |
| (3), (5) dN/dT (×10⁻⁶) | 9.9 | −6.2 | −6.2 | −6.2 | −6.2 | 9.9 | −6.2 | −6.2 |
| (6) |Fxp/Fxmax| | 1.000 | — | — | — | — | 0.958 | — | — |
| (7) − Σ (Pw × (dN/dT) × Fx) | | | 1.126 | | | | | 0.504 |
| (8) BF/LL | | | 0.202 | | | | | 0.201 |
| FOCUS SHIFT (mm) | | | 0.033 | | | | | 0.023 |

| | EXAMPLE 2 | | | | EXAMPLE 3 | | | |
|---|---|---|---|---|---|---|---|---|
| | LENS | | | | | | | |
| | L13 FIRST POSITIVE LENS | L14 FIRST POSITIVE LENS | L6 SECOND POSITIVE LENS | L8 SECOND POSITIVE LENS | L10 FIRST POSITIVE LENS | L11 FIRST POSITIVE LENS | L13 FIRST POSITIVE LENS | L14 FIRST POSITIVE LENS |
| (1) Vd | 81.54 | 81.54 | 67.72 | 67.72 | 81.54 | 81.54 | 81.54 | 81.54 |
| (2), (4) 0.0018Vd + P | 0.6842 | 0.6842 | 0.6463 | 0.6463 | 0.6842 | 0.6842 | 0.6842 | 0.6842 |
| (3), (5) dN/dT (×10⁻⁶) | −6.2 | −6.2 | 9.9 | 9.9 | −6.2 | −6.2 | −6.2 | −6.2 |
| (6) |Fxp/Fxmax| | — | — | 1.000 | 0.968 | — | — | — | — |
| (7) − Σ (Pw × (dN/dT) × Fx) | 0.504 | | | | −2.102 | | | |
| (8) BF/LL | 0.201 | | | | 0.201 | | | |
| FOCUS SHIFT (mm) | 0.023 | | | | −0.039 | | | |

TABLE 2

| | EXAMPLE 4 | | | | EXAMPLE 5 | | |
|---|---|---|---|---|---|---|---|
| | LENS | | | | | | |
| | L10 SECOND POSITIVE LENS | L12 FIRST POSITIVE LENS | L14 FIRST POSITIVE LENS | L15 FIRST POSITIVE LENS | L12 SECOND POSITIVE LENS | L14 FIRST POSITIVE LENS | L15 FIRST POSITIVE LENS |
| (1) Vd | 67.72 | 81.61 | 81.61 | 81.61 | 67.72 | 81.61 | 81.61 |
| (2), (4) 0.0018Vd + P | 0.6463 | 0.6855 | 0.6855 | 0.6855 | 0.6463 | 0.6855 | 0.6855 |
| (3), (5) dN/dT (×10$^{-6}$) | 9.9 | −5.9 | −5.9 | −5.9 | 9.9 | −5.9 | −5.9 |
| (6) \|Fxp/Fxmax\| | 0.953 | — | — | — | 0.990 | — | — |
| (7) − Σ (Pw × (dN/dT) × Fx) | | 1.951 | | | | 0.910 | |
| (8) BF/LL | | 0.270 | | | | 0.270 | |
| FOCUS SHIFT (mm) | | 0.052 | | | | 0.045 | |

TABLE 3

| | EXAMPLE 6 | | | | EXAMPLE 7 | | | | EXAMPLE 8 | | |
|---|---|---|---|---|---|---|---|---|---|---|---|
| | LENS | | | | | | | | | | |
| | L11 SECOND POSITIVE LENS | L12 FIRST POSITIVE LENS | L14 FIRST POSITIVE LENS | L15 FIRST POSITIVE LENS | L11 FIRST POSITIVE LENS | L12 SECOND POSITIVE LENS | L14 FIRST POSITIVE LENS | L15 FIRST POSITIVE LENS | L11 SECOND POSITIVE LENS | L12 SECOND POSITIVE LENS | L14 FIRST POSITIVE LENS | 115 FIRST POSITIVE LENS |
| (1) Vd | 67.72 | 81.61 | 81.61 | 81.61 | 81.61 | 67.72 | 81.61 | 81.61 | 67.72 | 67.72 | 81.61 | 81.61 |
| (2), (4) 0.0018Vd + P | 0.6463 | 0.6855 | 0.6855 | 0.6855 | 0.6855 | 0.6463 | 0.6855 | 0.6855 | 0.6463 | 0.6463 | 0.6855 | 0.6855 |
| (3), (5) dN/dT (×10$^{-6}$) | 9.9 | −5.9 | −5.9 | −5.9 | −5.9 | 9.9 | −5.9 | −5.9 | 9.9 | 9.9 | −5.9 | −5.9 |
| (6) \|Fxp/Fxmax\| | 0.968 | — | — | — | — | 0.963 | — | — | 0.965 | 0.957 | — | — |
| (7) − Σ (Pw × (dN/dT) × Fx) | | 2.668 | | | | | 2.720 | | | | −0.614 | |
| (8) BF/LL | | 0.347 | | | | | 0.348 | | | | 0.350 | |
| FOCUS SHIFT (mm) | | 0.064 | | | | | 0.072 | | | | −0.029 | |

TABLE 4

| | COMPARISON EXAMPLE 1 | | | | COMPARISON EXAMPLE 2 | | | COMPARISON EXAMPLE 3 | | | |
|---|---|---|---|---|---|---|---|---|---|---|---|
| | LENS | | | | | | | | | | |
| | L10 FIRST POSITIVE LENS | L11 FIRST POSITIVE LENS | L13 FIRST POSITIVE LENS | L14 FIRST POSITIVE LENS | L12 FIRST POSITIVE LENS | L14 FIRST POSITIVE LENS | L15 FIRST POSITIVE LENS | L11 FIRST POSITIVE LENS | L12 FIRST POSITIVE LENS | L14 FIRST POSITIVE LENS | L15 FIRST POSITIVE LENS |
| (1) Vd | 81.54 | 81.54 | 81.54 | 81.54 | 81.61 | 81.61 | 81.61 | 81.61 | 81.61 | 81.61 | 81.61 |
| (2), (4) 0.0018Vd + P | 0.6842 | 0.6842 | 0.6842 | 0.6842 | 0.6855 | 0.6855 | 0.6855 | 0.6855 | 0.6855 | 0.6855 | 0.6855 |
| (3), (5) dN/dT (×10$^{-6}$) | −6.2 | −6.2 | −6.2 | −6.2 | −5.9 | −5.9 | −5.9 | −5.9 | −5.9 | −5.9 | −5.9 |
| (6) \|Fxp/Fxmax\| | — | — | — | — | — | — | — | — | — | — | — |
| (7) − Σ (Pw × (dN/dT) × Fx) | | 3.858 | | | | 3.729 | | | 5.510 | | |
| (8) BF/LL | | 0.203 | | | | 0.270 | | | 0.359 | | |
| FOCUS SHIFT (mm) | | 0.098 | | | | 0.102 | | | 0.152 | | |

What is claimed is:

1. An optical system which is used in a wavelength range including a near ultraviolet light range having a wavelength longer than approximately 350 nm and a visible light range, comprising:
at least two first positive lenses satisfying the following conditional expressions (1) to (3) disposed closer to a contraction side than an aperture stop; and
at least one second positive lens satisfying the following conditional expressions (1), (4) and (5):

$$60 < Vd \tag{1}$$

$$0.67 < 0.0018 Vd + P \tag{2}$$

$$-7.5 \times 10^{-6} < dN/dT < -0.5 \times 10^{-6} \tag{3}$$

$$0.645 < 0.0018 Vd + P \tag{4}$$

$$9 \times 10^{-6} < dN/dT \tag{5}$$

where, Vd denotes an Abbe number at the d-line, P=(Ng−NF)/(NF−NC), Ng denotes a refractive index at the g-line, NF denotes a refractive index at the F-line, NC denotes a refractive index at the C-line, and dN/dT denotes a rate of change of the refractive index with respect to temperature in a vicinity of room temperature.

2. An optical system according to claim 1, wherein the at least one second positive lens satisfies the following conditional expression:

$$0.85 < |Fxp/Fxmax| \tag{6}$$

where, Fxp denotes a distance between an optical axis and a light beam that passes through a position farthest from an optical axis on a lens surface of either an enlargement side or the contraction side in an on-axis light beam that passes through the at least one second positive lens, and Fxmax denotes a maximum value of a distance (Fx) between the optical axis and a light beam that passes through a position farthest from the optical axis on a lens surface of either the enlargement side or the contraction side in the on-axis light beam that passes through each lens constituting the optical system.

3. An optical system according to claim 2, wherein the optical system satisfies the following conditional expression:

$$-3 < -\Sigma(Pw \times (dN/dT) \times Fx) < 3.5 \qquad (7)$$

where, Pw denotes power of each lens constituting the optical system, Fx denotes a distance between the optical axis and a light beam that passes through a position farthest from the optical axis on a lens surface of either the enlargement side or the contraction side in the on-axis light beam that passes through each lens constituting the optical system, and dN/dT denotes a rate of change of the refractive index of each lens constituting the optical system with respect to temperature in the vicinity of room temperature.

4. An optical system according to claim 3, wherein the optical system satisfies the following conditional expression:

$$0.1 < BF/LL < 0.5 \qquad (8)$$

where, BF denotes a back focus amount, which is an air conversion value, of the optical system on the contraction side (air conversion value), and LL denotes a total length of the optical system from the first lens surface to the last lens surface of the optical system.

5. An optical system according to claim 3, wherein the optical system is used for magnifying and projecting an image.

6. An optical system according to claim 3, wherein the optical system is used for forming an image of an object on an image pickup element.

7. An optical system according to claim 2, wherein the second positive lens is made of quartz glass.

8. An optical system according to claim 7, wherein the optical system satisfies the following conditional expression:

$$0.1 < BF/LL < 0.5 \qquad (8)$$

where, BF denotes a back focus amount, which is an air conversion value, of the optical system on the contraction side (air conversion value), and LL denotes a total length of the optical system from the first lens surface to the last lens surface of the optical system.

9. An optical system according to claim 2, wherein the optical system satisfies the following conditional expression:

$$0.1 < BF/LL < 0.5 \qquad (8)$$

where, BF denotes a back focus amount, which is an air conversion value, of the optical system on the contraction side, and LL denotes a total length of the optical system from a first lens surface to a last lens surface of the optical system.

10. An optical system according to claim 1, wherein the optical system satisfies the following conditional expression:

$$-3 < -\Sigma(Pw \times (dN/dT) \times Fx) < 3.5 \qquad (7)$$

where, Pw denotes power of each lens constituting the optical system, Fx denotes a distance between an optical axis and a light beam that passes through a position farthest from the optical axis on a lens surface of either an enlargement side or the contraction side in an on-axis light beam that passes through each lens constituting the optical system, and dN/dT denotes a rate of change of the refractive index of each lens constituting the optical system with respect to temperature in the vicinity of room temperature.

11. An optical system according to claim 10, wherein the second positive lens is made of quartz glass.

12. An optical system according to claim 10, wherein the optical system satisfies the following conditional expression:

$$0.1 < BF/LL < 0.5 \qquad (8)$$

where, BF denotes a back focus amount, which is an air conversion value, of the optical system on the contraction side, and LL denotes a total length of the optical system from a first lens surface to a last lens surface of the optical system.

13. An optical system according to claim 1, wherein the second positive lens is made of material having a transmittance of 80% or higher for light having a wavelength of 350 nm with respect to the material having a thickness of 10 mm.

14. An optical system according to claim 1, wherein the second positive lens is made of quartz glass.

15. An optical system according to claim 14, wherein the optical system satisfies the following conditional expression:

$$0.1 < BF/LL < 0.5 \qquad (8)$$

where, BF denotes a back focus amount, which is an air conversion value, of the optical system on the contraction side, and LL denotes a total length of the optical system from a first lens surface to a last lens surface of the optical system.

16. An optical system according to claim 1, wherein the optical system is used for magnifying and projecting an image.

17. An optical system according to claim 1, wherein the optical system is used for forming an image of an object on an image pickup element.

18. An optical system according to claim 1, wherein the optical system satisfies the following conditional expression:

$$0.1 < BF/LL < 0.5 \qquad (8)$$

where, BF denotes a back focus amount, which is an air conversion value, of the optical system on the contraction side, and LL denotes a total length of the optical system from a first lens surface to a last lens surface of the optical system.

19. An image projection apparatus comprising:
an optical modulation element which modulates light in accordance with image data;
an illumination optical system which leads the light to the optical modulation element; and
an optical system which leads the light modulated by the optical modulation element to a projection surface, the optical system including
at least two first positive lenses which satisfy the following conditional expressions (1) to (3) and are disposed closer to a contraction side than an aperture stop, and
at least one second positive lens which satisfies the following conditional expressions (1), (4) and (5):

$$60 < Vd \qquad (1)$$

$$0.67 < 0.0018 Vd + P \qquad (2)$$

$$-7.5 \times 10^{-6} < dN/dT < -0.5 \times 10^{-6} \qquad (3)$$

$$0.645 < 0.0018 Vd + P \qquad (4)$$

$$9 \times 10^{-6} < dN/dT \qquad (5)$$

where, Vd denotes an Abbe number at the d-line, P=(Ng−NF)/(NF−NC), Ng denotes a refractive index at the g-line, NF denotes a refractive index at the F-line, NC denotes a refractive index at the C-line, and dN/dT denotes a rate of change of the refractive index with respect to temperature in a vicinity of room temperature.

20. An image projection apparatus according to claim 19, wherein the at least one second positive lens satisfies the following conditional expression:

$$0.85 < |Fxp/Fxmax| \tag{6}$$

where, Fxp denotes a distance between an optical axis and a light beam that passes through a position farthest from the optical axis on a lens surface of either an enlargement side or the contraction side in an on-axis light beam that passes through the at least one second positive lens, and Fxmax denotes a maximum value of a distance (Fx) between the optical axis and a light beam that passes through a position farthest from the optical axis on a lens surface of either the enlargement side or the contraction side in the on-axis light beam that passes through each lens constituting the optical system.

21. An image pickup device comprising:
an optical system through which light enters from an object; and
an image pickup element which receives a light from the optical system, wherein
the optical system including
at least two first positive lenses which satisfy the following conditional expressions (1) to (3) and are disposed closer to a contraction side than an aperture stop, and
at least one second positive lens which satisfies the following conditional expressions (1), (4) and (5):

$$60 < Vd \tag{1}$$

$$0.67 < 0.0018 Vd + P \tag{2}$$

$$-7.5 \times 10^{-6} < dN/dT < -0.5 \times 10^{-6} \tag{3}$$

$$0.645 < 0.0018 Vd + P \tag{4}$$

$$9 \times 10^{-6} < dN/dT \tag{5}$$

where, Vd denotes an Abbe number at the d-line, P=(Ng−NF)/(NF−NC), Ng denotes a refractive index at the g-line, NF denotes a refractive index at the F-line, NC denotes a refractive index at the C-line, and dN/dT denotes a rate of change of the refractive index with respect to temperature in a vicinity of room temperature.

* * * * *